United States Patent [19]
Le Borne

[11] Patent Number: 5,136,512
[45] Date of Patent: Aug. 4, 1992

[54] GROUND COLLISION AVOIDANCE SYSTEM

[75] Inventor: Richard C. Le Borne, San Diego, Calif.

[73] Assignee: Cubic Defense Systems, Inc., San Diego, Calif.

[21] Appl. No.: 659,521

[22] Filed: Feb. 22, 1991

Related U.S. Application Data

[63] Continuation of Ser. No. 212,926, Jun. 26, 1988, abandoned.

[51] Int. Cl.⁵ .............................................. G06F 15/50
[52] U.S. Cl. .................................. 364/461; 340/970
[58] Field of Search ................ 364/461, 433, 427; 340/970, 963; 342/165

[56] References Cited

U.S. PATENT DOCUMENTS

| | | | |
|---|---|---|---|
| 3,715,718 | 2/1973 | Astengo | 340/964 |
| 3,922,637 | 11/1975 | Bateman | 340/970 |
| 3,925,751 | 12/1975 | Bateman et al. | 340/967 |
| 3,930,143 | 12/1975 | Muller | 364/444 |
| 3,934,221 | 1/1976 | Bateman et al. | 340/970 |
| 3,934,222 | 1/1976 | Bateman et al. | 340/970 |
| 3,936,796 | 2/1976 | Bateman | 340/970 |
| 3,944,968 | 3/1976 | Bateman et al. | 340/970 |
| 3,946,358 | 3/1976 | Bateman | 340/970 |
| 3,947,808 | 3/1976 | Bateman | 340/970 |
| 3,947,809 | 3/1976 | Bateman | 340/970 |
| 3,947,810 | 3/1976 | Bateman et al. | 340/970 |
| 3,958,218 | 5/1976 | Bateman | 340/970 |
| 3,958,219 | 5/1976 | Bateman et al. | 340/970 |
| 3,988,713 | 10/1976 | Bateman | 340/970 |
| 4,030,065 | 6/1977 | Bateman | 340/970 |
| 4,060,793 | 11/1977 | Bateman | 340/970 |
| 4,121,287 | 10/1978 | Leal et al. | 364/461 |
| 4,215,334 | 7/1980 | Bateman | 340/970 |
| 4,224,669 | 9/1980 | Brame | 364/433 |
| 4,433,323 | 2/1984 | Grove | 340/970 |
| 4,567,483 | 1/1986 | Bateman et al. | 340/970 |
| 4,646,244 | 2/1987 | Bateman et al. | 364/461 |
| 4,684,948 | 8/1987 | Bateman | 340/970 |
| 4,792,799 | 12/1988 | Grove | 340/970 |
| 4,818,992 | 4/1989 | Paterson | 340/470 |

OTHER PUBLICATIONS

Brochure entitled "Ground Collision Avoidance System From Cubic Defense System" (no date), Cubic Defense Systems, San Diego, Calif.

*Primary Examiner*—Thomas G. Black
*Attorney, Agent, or Firm*—Brown, Martin, Haller & McClain

[57] ABSTRACT

A method and system for avoiding ground collision through pilot warning messages which is implemented in aircraft having a plurality of sensors, onboard inertial navigation units, and altimeters for measuring aircraft performance or flight characteristics. Data is collected through a digital interface unit from data buses connected to these sources, transferred to one or more storage locations and a data validation unit for determining the validity of current altitude data. A series of data processing elements use the aircraft data to extrapolate an aircraft altitude path forward during a predetermined period of time as a function of the aircraft flight data. The extrapolated altitutde allows extrapolation of an aircraft flight path as a function of predicted terrain variations and changes in altitude in response to recovery from various aircraft maneuvers such as rolling, banking, diving, climbing, or accelerating. The extrapolated altitude, or changes in altitude, is compared to one or more predetermined safety limits, and one or more warning messages are provided if the extrapolated altitude is lower than an appropriate limit.

4 Claims, 19 Drawing Sheets

GROUND COLLISION AVOIDANCE SYSTEM

This is a continuation of application Ser. No. 07/212,926, filed Jun. 26, 1988 now abandoned.

BACKGROUND OF THE INVENTION

1. Field of the Invention

The present invention relates to aircraft warning systems and more particularly to a warning system and method that monitors aircraft sensor data and provides warnings of a potential ground collision based on projected flight path analysis. The invention further relates to a method and apparatus configured for integration into advanced electronic data systems for accumulating available flight data and projecting a probable flight path above terrain.

2. Background of the Related Art

It is well understood in aviation technology and design that the inability of a pilot to know the full condition of an aircraft, or to perceive imminent danger, results in many aircraft crashes. Such is the case in those crashes occurring in fog or other bad weather or those where instrument indications were not sufficient to show an obstruction or other aircraft before it was too late. Another example is the sudden alteration of flight characteristics due to aircraft damage which cannot be rapidly understood and definitely not observed from the pilot's vantage point. Therefore, appropriate corrective measures are often not taken before it is too late. In addition, airframe or control system failures have increasingly significant impacts on aircraft performance. The advanced technology control systems on which many new commercial and military aircraft pilots must rely are so critical to the operation of the aircraft that any failure during aircraft maneuvering can lead to loss of control.

However, even in "good" weather, with external influences minimized, copious instrumentation, and full pilot control, crashes still occur. The "controlled flight into terrain" type of crash results from a variety of factors including pilot error as a result of fatigue or distraction, and instrumentation error.

In order to help counter some of these problems, a variety of altitude and collision avoidance instruments or warning devices have been developed. Such instruments generally monitor current aircraft altitude above local terrain and downward velocity or "sink rate" to determine if the aircraft is dropping below a predetermined safe altitude limit. These systems generally rely on radar altimeters to establish current altitude above terrain and vertical velocity or sink rate. The sink rate represents a ground closure rate which has a corresponding "safe" altitude or ground separation distance above which it is assumed the aircraft can easily maneuver to avoid ground collision. When an aircraft drops below this altitude an alarm is sounded to cause the pilot to change the aircraft flight configuration and thereby alter the ground closure rate. However, prior art warning systems have tended to provide "false" warnings under conditions such as short periods of negative upward acceleration on take-off where pilots knew there was no real danger. When these systems are made very sensitive, they tend to provide false warnings over highly variable terrain. If the warning system provides too many "false" warnings it is ignored by flight crew or pilots and loses its value.

Aircraft used in commercial passenger and freight transport do not use highly complex or demanding maneuvering patterns. Nevertheless, highly crowded flight paths and air traffic corridors place a severe demand on pilot attention. Pilots often need to rely on warning systems to help them react to problems that cannot focus on. It is imperative that such as system have pilot confidence. A system that more accurately accounts for aircraft performance and capability to recover from a given ground closure or low altitude scenario would help increase pilot trust and likelihood of use.

For military aircraft the operating problems or considerations are more stringent in terms of aircraft performance during maneuvering. In an environment where the pilot is keeping track of other aircraft and/or undertaking a series of complex or extreme maneuvers it becomes increasingly difficult to observe terrain closure. While there is generally an abundance of instrumentation on-board, this presents more of an over-information distraction than an aid. It is not possible for a pilot to constantly monitor all flight instrumentation nor adequately comprehend the information provided under combat conditions. The pilot needs a quick and direct warning of ground closure.

In addition, stealth flying and other advanced combat type maneuvers often call for a pilot to "over-fly" his instruments, that is, fly the aircraft in configurations or at altitudes that are considered dangerous according to conventional instrumentation but from which highly maneuverable aircraft with high power engines have a margin for recovery. In this situation pilots begin to rely totally on the feel of the aircraft and a sense of direction, since instrumentation based on current readings does not respond fast enough to warn of rapid changes.

Unfortunately, it is extremely difficult if not impossible for pilots to adequately judge the recovery capability or margin of safety for advanced technology aircraft in high stress maneuvering situations since these aircraft have very complex control systems and functions. Also, altitude is affected by various aspects of aircraft maneuvering including climbing or diving, rolling, and banking in addition to the vertical velocity and acceleration. In addition, changes in airframe loading and weight contribute in a manner unpredictable or not always observable to a pilot attending to target tracking during maneuvering. To hold the aircraft at the maximum maneuvering limits yet provide a margin of safety the pilot needs help. However, current warning systems react too slowly and rely on simple "current" altitude readings which do not adequately predict flight path for a maneuvering aircraft at high speeds. The current warning indicators have failed to recognize or treat any interrelationship between vertical velocity, maneuvering, or other aircraft flight characteristics.

What is needed then is a method or apparatus for providing improved high speed response in a warning system that presents brief and useful information and also commands pilot attention in high activity situations. A warning system is also desired that minimizes false alarms.

SUMMARY

In view of the above problems in the art, one purpose of the present invention is to provide a method of projecting an aircraft flight path forward in time to provide prediction of terrain closure.

Another purpose of the invention is to provide a warning system that accounts for several dynamic characteristics of an aircraft when determining terrain closure.

An advantage of the present invention is that the method is implemented using apparatus that interfaces with a variety of sensor types through standard data bus connections.

Another advantage of the present invention is that it provides a dynamic warning system which decreases erroneous warning messages due to its reliance on a variety of aircraft performance data.

These and other purposes, objects, and advantages are realized in a method and system for avoiding ground collision through pilot warning messages for use in an aircraft having a plurality of sensors for detecting flight information or characteristics of the aircraft. The method comprises using a digital interface unit to collect data from aircraft sensors, checking the validity of the current altitude data, extrapolating aircraft altitude forward during a predetermined period of time as a function of the aircraft flight data, comparing the results of the altitude extrapolation to predetermined safety limits, and providing one or more warning messages if the extrapolated altitude is lower than a prescribed safety limit.

In the preferred warning system, the digital interface is typically defined to comprise a remote terminal which is connected to one or more aircraft data buses which are used for transferring digital information from aircraft sensors to other devices, and also comprises an internal processor for controlling the transfer of data and communication interrupt commands. Data collected by the digital interface is transferred to a shared memory for accumulating sensor data with altitude measurements being transferred to a data validation unit for determining the validity of collected altitude data. A series of data processing elements extrapolate changes in altitude due to various aircraft maneuvers such as rolling, banking, diving, climbing, or accelerating. Warnings are then issued by a warning element when the processing elements generate a total altitude change below preselected safety limits.

In further aspects of the invention, the aircraft data is collected by monitoring data transferred on at least one data bus connected to the aircraft sensors and copying predetermined types of data to a storage location for use in the extrapolation steps. The collected data words are formatted into a collected data message which is used to transfer collected data to a storage location.

The validity of altitude data or measurements is checked by storing a series of consecutive measurements for the aircraft altitude above mean sea level in a memory or storage location with the altitude measurements covering a range from a current value to an $i^{th}$ previous value. A series of consecutive vertical velocity measurements corresponding to the stored mean sea level altitude measurements and covering a range from a current value to an $i^{th}$ previous value are also stored. Each of the $i^{th}$ velocities are multiplied by $i$ and by a predefined sampling period to produce a predicted change in altitude since the $i^{th}$ value was measured. Preferably, the validity of altitude measurements are checked by storing a series of at least 5 consecutive height above mean sea level measurements and having i range from 1 to at least 4 with the predefined factor set equal to about 1.3.

The predicted changes in altitude are averaged to produce an average change in altitude which is differenced with the current altitude measurement to produce a residual altitude error for extrapolation. An altitude tolerance value is generated which is equal to an absolute value of the current vertical velocity times the product of the sampling period and a predefined safety factor. The absolute value of the altitude tolerance value and residual altitude error are then compared. A "bad data" condition is indicated when the tolerance value is less than the residual value.

The aircraft altitude is then extrapolated forward by performing terrain filtering using a Kalman filter on the altitude data, computing pilot and aircraft response times, and extrapolating altitude lost during roll recovery, dive/climb recovery, and pilot response delay.

In the terrain filtering step, a height above terrain measurement is set equal to valid radar data or, where the radar data is determined to be invalid, equal to valid height above mean sea level data minus a stored terrain estimate. The mean sea level data is used for a predetermined number of processing cycles for which the radar data is invalid depending upon dive and roll angles. Steeper dive/climb angles cause the length of time an extrapolation estimate is used to increase and smaller roll angles decrease this time. If neither type of altitude data is valid then a no warning capability is indicated. The filter extrapolates a covariance matrix and a terrain estimate from the altitude data and computes a filter measurement, a filter residual, radar noise variance according to current dive/climb angle measurements, filter gains, and filter states. The covariance matrix is updated on subsequent cycles. Input altitude data is compared to one or more tolerance values and the filtering process is terminated when the tolerance values are exceeded.

The step of calculating a pilot response time comprises selecting a predetermined response time, such as 1 second when aircraft normal acceleration in gravitational units, g, is greater than a first preselected limit, such as 1 g, decreasing the response time linearly as the normal acceleration decreases below the first preselected limit and setting a second predetermined response time, such as 0.30 seconds when the normal acceleration drops below a second preselected limit, such as $-1$ g. The linear adjustment to pilot response is preferably accomplished by selecting a response time of 0.65 seconds plus 0.35 times the value of the normal acceleration. Additionally, an extrapolated dive angle is set equal to an inertial dive angle measurement.

The step of extrapolating a dive angle comprises computing an extrapolated angle according to one of a series of mathematical relationships which are used according to the magnitude of the dive/climb angle. In the preferred embodiment the dive angle is divided into three ranges of values, greater than 5 degrees, less than 5 but greater than $-15$ degrees and less than or equal to $-15$ degrees and there are three corresponding relationships used to compute the extrapolated angle.

The step of extrapolating altitude loss during roll recovery comprises computing a length of time, $T_{ROLL}$ required to adjust an aircraft bank angle of said aircraft to a predetermined base value and a change in altitude during said $T_{ROLL}$ period. The step of extrapolating altitude loss during dive recovery comprises computing a target loading factor $n(V_E)$ and a coefficient function $f(V_E, \gamma \text{ ext})$ in accordance with equivalent airspeed and an extrapolated dive angle $\gamma_{ext}$ where the function has coefficients determined by aircraft flight performance factors, and computing a change in altitude during the dive recovery period. The step of extrapolating altitude loss during pilot response time comprises retrieving data for measured values of vertical acceleration $a_Z$, vertical velocity $V_Z$ and computed pilot response time and using these values to compute a change in altitude during the pilot response time.

The method of the present invention further comprises summing the above extrapolated altitude losses during roll recovery, dive recovery, and pilot response time so as to form a total extrapolated altitude loss value. This resulting total extrapolated altitude loss is compared by a warning element with a predefined altitude buffer value to detect if the aircraft altitude is within a predetermined limit.

A cycle counter is incremented when the detected altitudes are below the set limit and checked to see if it has obtained a preselected number which represents the number of cycles during which the aircraft is allowed to recover before issuing a warning. If the aircraft returns to within the desired altitude limits before a set number of cycles the counter is adjusted to zero. Otherwise, a warning message is generated when the counter reaches the preselected number of cycles, which is preferably 3. At this time the counter is reset to zero and the selected message is transferred to an output device.

The warning message is generated by a warning element connected to the process control means which uses a storage means for storing a series of preconfigured messages that are retrieved in response to message criteria provided by the the data processing means. The messages are transferred through an output element which configures retrieved messages as aural and/or visual messages for presentation to aircraft personnel.

The ground collision avoidance system of the present invention generates a warning message "ALTITUDE, ALTITUDE" when measured altitude falls below an extrapolated recovery altitude and suppresses all other messages for a predetermined delay period. Each message is transferred twice with a fixed delay between the transfers. The message "PULL UP" is selected for transfer when 5 seconds has passed, the "ALTITUDE, ALTITUDE" message has been transmitted, and the message counter reaches the preselected number of cycles while the aircraft is still below the predetermined buffer limit.

Therefore, the system and method of the present invention provide improved warning capabilities based on variable aircraft characteristics and performance.

BRIEF DESCRIPTION OF THE DRAWINGS

The novel features of the present invention may be better understood from the accompanying description when taken in conjunction with the accompanying drawings in which like characters refer to like parts and in which.

DETAILED DESCRIPTION OF A PREFERRED EMBODIMENT

The present invention provides an aircraft warning system that extrapolates or projects a current aircraft flight path forward in time to determine the potential for ground collision or controlled flight into terrain. The warning system employs a method and apparatus for monitoring data being transferred to or from a variety of on-board aircraft sensors, inertial navigational units, warning systems, airdata computers, and altimeters and for applying a series of predefined processing relationships or algorithms to this data to formulate a prediction of aircraft altitude relative to aircraft performance, flight characteristics and variations in local terrain. The results of this extrapolation are used to trigger warning messages when the extrapolated altitude above terrain indicates that there is a likelihood of ground collision.

The method of the invention is accomplished by interfacing data storage and analysis components with existing avionics sensors and equipment through connection to standard aircraft data buses, or, where necessary, analog to digital converters. The aircraft data is monitored and accumulated in data storage or memory circuitry for transfer during subsequent processing steps into functional units that provide validation of altitude data and extrapolation of altitude, or changes in altitude, as a function of different aircraft characteristics. If the system predicts an impact with the ground then one of a series of prestored messages is selected for timed transfer to visual and audio broadcasting equipment in the aircraft. The steps of the invention can be implemented as a series of program instructions and commands in a microprocessor controlled apparatus.

Figure 1:
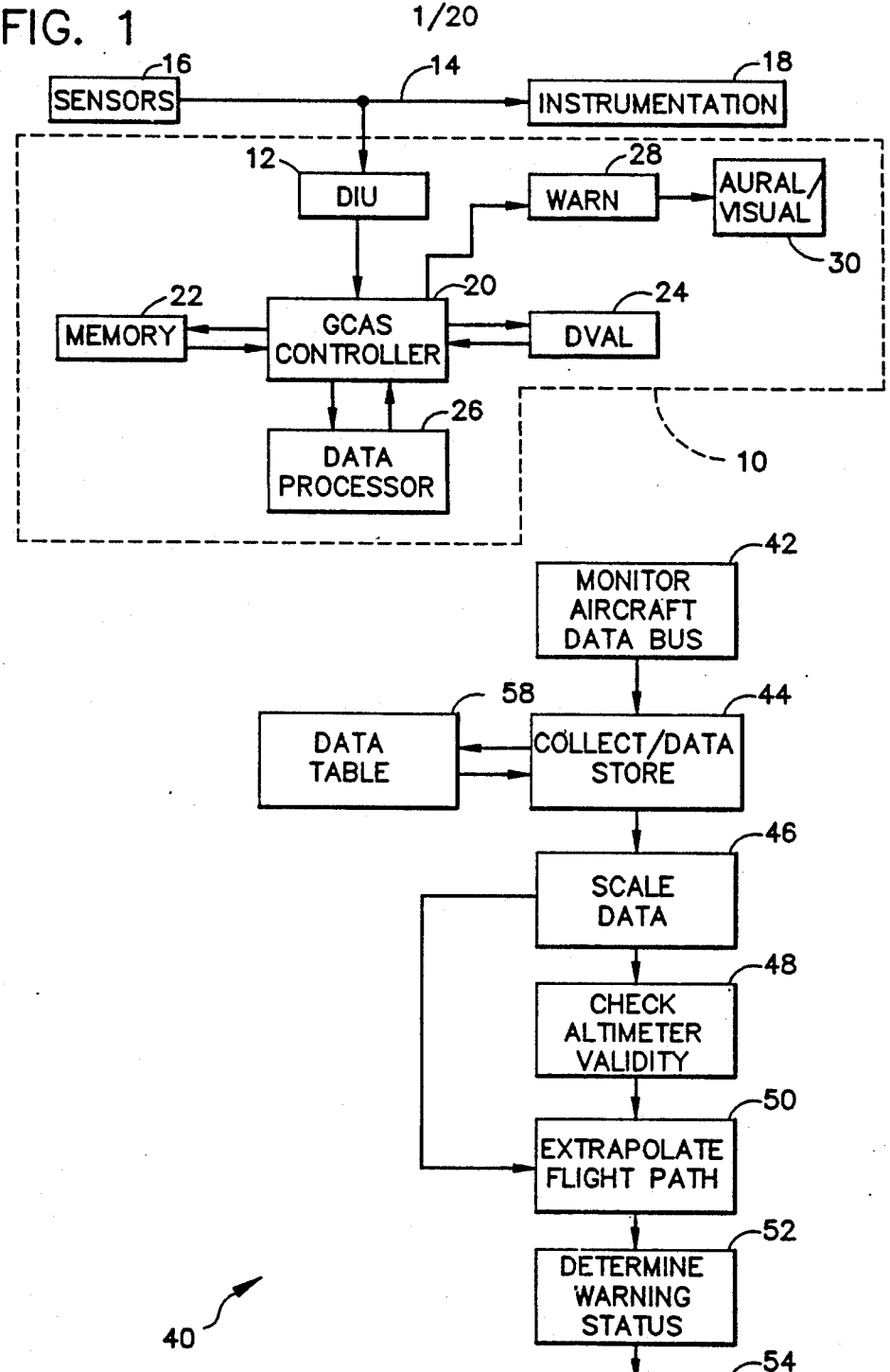
FIG. 1 illustrates a ground collision avoidance system constructed according to the principles of the present invention.

A preferred embodiment of the apparatus used in the ground collision avoidance system of the present invention is illustrated in block diagram form in FIG. 1. The method implemented by the apparatus of FIG. 1 is illustrated in the flow chart of FIG. 2.

In FIG. 1, an aircraft Ground Collision Avoidance System (GCAS) 10 is illustrated having a Digital Interface Unit (DIU) 12 connected to one or more aircraft data buses 14 which are connected between a series of data sensors 16 and various aircraft instrumentation devices 18.

Current commercial passenger and military aircraft use a variety of on-board sensors to measure aircraft flight characteristics or performance. The sensors are commercially available units well understood in the art and not shown or described in further detail here. Typical sensor data comprises among other things, air speed, ground speed, climb, dive, roll, or bank angles, altimeter readings, and barometric pressure. The sensor data is provided along one or more data buses connected to aircraft instrumentation and airdata or mission computers.

Each data bus comprises a standardized serial data path for words or data messages to be transferred from the sensors or preliminary processing equipment to gauges or on-board processors. While analog and single channel or bit-width buses can be found in older aircraft or private planes, the buses 14 are generally configured as high speed, multiplexed transfer paths with internal communications protocols and acknowledgment controls.

In commercial aircraft, standardized protocols, transfer rates, and data formats are typically controlled by Federal Aviation Agency standards for such equipment to promote uniformity and prevent operational conflicts or problems due to equipment variations. It is extremely important to have predictable uniformity to allow interfacing and upgrading for required safety equipment. Examples of such bus standards are the ARINC 600 industry standard for mounting and service connections or the ARINC 429 data word format standards.

In military aircraft, data bus standards are rigidly controlled by military specifications such as the MIL-STD-1553 multiplex data bus standard for fighter aircraft. This is done to allow a variety of manufacturers to provide equipment that can be integrated into a single avionics system without undue complication. It also provides a uniform system of interconnection or communication so that equipment can be updated or changed without reworking the entire system.

The serial multiplex data bus 14, whether commercial or military, uses fixed message formats to transfer data to airdata computers, mission control computers and systems, and other flight or even weapons related systems requiring basic flight information to perform. The present invention employs the digital interface unit 12 to essentially eavesdrop on the internal communication of data or sensor messages which are currently passed along the multiplexed data bus 14. The data messages are configured as message types, or otherwise labeled to differentiate their source and destination. The DIU 12 is configured to monitor the bus 14 for specific types of messages or data using one or more message type look-up tables, FIG. 2, 58, along with any associated acknowledgment codes to prevent interruption of bus service. This allows the interception of desired data and commands on the bus while ignoring extraneous information.

An example of message types are data messages used in an F/A-18 or other advanced military aircraft where messages use designations or type labels such as the numbers 37, 38, 46 and 85. Each message comprises a series of data words which are transferred serially along the data bus 14 to a specified location. Different messages use different numbers of data words depending on the information to be transferred and the receiving or target location. An example is the message type 37 which is transferred to an F/A-18 mission computer and contains 28 data words with words 9, 11, 12, 14, 15, and 16 being used to transfer measured information for true angle of attack, true airspeed, indicated airspeed, air density ratio, and first and second words for baro-corrected pressure altitude, respectively. Other messages such as the one designated number 46 comprise fewer total data words, 14, and provide fewer useful (for the present invention) parameter values such as word 5 for A/C normal acceleration and word 8 for flight path angle. There are a number of other message types and similar messages are available in commercial or other aircraft, although less complex look up tables may be needed to monitor them.

The DIU 12 performs the function of performing multiplex data bus interfacing, gathering multiplexed bus data from the aircraft's serial data bus, formatting the collected data into an appropriate message data format, and maintaining system timing and transfer of data relative to other processing apparatus. In the preferred embodiment, the DIU 12 collects MIL-STD-1553 serial multiplex bus data from two F/A-18 aircraft busses which is then formatted for transfer to the GCAS control processor 20.

In the F/A-18, for purposes of redundancy and resource allocation two data buses are used and must be monitored. The amount of redundancy and complexity of control systems determines whether multiple data buses and specific types of data are present in other aircraft. Those skilled in the design of aircraft and aircraft warning systems understand the differing data bus designs which need not be described in detail here. The present invention takes advantage of the existing data bus structures that have been developed and standardized throughout the aircraft construction industries. This allows application of the warning system method of the present invention to any aircraft without restructuring for sensor variations.

The digital interface unit 12 hardware generally comprises two main sub-sections or components. The first is a remote terminal for connection directly to the multiplexed data bus 14, or through intermediate bus controllers. The second is an interface processor which uses appropriate command sequences and instructions to control the digital interface unit 12 and perform the formatting and transfer functions for collected data. The interface processor also provides interrupt commands for the data bus 14 to provide proper interception of data without disrupting data bus communications.

The remote terminal acts as a programmable peripheral micro-controller for the internal processor which is initialized at power-up or upon reset. At initialization the interface processor uses stored commands to instruct the remote terminal what data bus position to monitor, if there is more than one, which types of messages to collect, and set basic communication and command protocol. The remote terminal monitors data messages as they are transferred on the bus 14 at periodic intervals from the various sensors, although at differing rates. The variable rates may require several access or collection cycles to acquire all of the desired data for each transfer message. The remote terminal must operate at data collection rates commensurate with the data bus 14 configuration. A 1553 high speed data bus is updated every 5 Hz which sets limits for the remote terminal timing.

Data collected by the remote terminal is generally stored by the interface processor in a series of internal buffers and an input GCAS message is then constructed from these messages. A translation table is used to designate the source buffer, both type and size of message, destination position, size of data field etc. The GCAS message must must be generated in minimum foreground cycle time to be ready when that cycle is completed to transfer. The GCAS message structure allows automatic transfer and storage of desired data in fixed memory locations for efficient access in subsequent processing. The remote terminal transfers data in a background mode allowing continued data collection or monitoring.

The interface processor operates as a continuous background cycle, asynchronous with the remote terminal to check for pending data, to see if a GCAS message is ready for output and formats received data into the GCAS message block. Data is collected by the remote terminal and transferred to or through the interface processor each background cycle which consists of most recent aircraft data available required to prepare the GCAS data message. The data is then transferred from the appropriate buffer to the GCAS 10 through the GCAS controller 20.

Data received from or collected by the DIU 12 is loaded into a shared memory structure for use by more than one processing unit or element to make the data broadly available while providing status checking for individual data. The shared memory typically comprises an array of registers or memory locations such as conventionally provided by random access memory integrated circuits.

Figure 2:
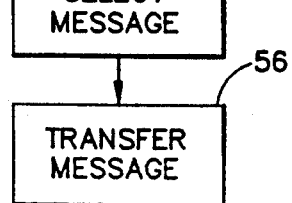
FIG. 2 illustrates the method of the present invention in flow chart form.

As shown in FIG. 2, data being transferred on an aircraft data bus is monitored in a step 42 and collected and stored in step 44 at regular intervals. The update period or collection cycle, $\Delta T$, varies according to aircraft type and usage such as military versus commercial but a sampling period on the order of 100 milliseconds is typical. Only the data of interest is collected and excess messages are ignored. The data is transferred through the GCAS controller 20 and stored in a memory or data storage location 22 for later retrieval. While the functional applications of the controller 20 and memory 22 are separate, those skilled in the art will readily understand that they can be incorporated as part of a single processing circuit. Alternatively, the memory 22 can comprise several memory elements or integrated circuits for data storage and transfer.

The preferred embodiment of the present invention accumulates at least fourteen specific data words or types of information provided by aircraft sensors and airdata computers. The data labels or parameters covered by the desired data are listed in Table I. However, GCAS memory 22 is also capable of accumulating additional data values generated during processing of the representative altitude and aircraft sensory input as described below.

Table I

True angle of attack
Indicated airspeed
Air density Ratio
Barometric corrected pressure altitude
A/C normal acceleration
Roll
Flight path angle
True airspeed
Vertical acceleration
Vertical velocity
Roll rate
Radar altitude
Radar altitude rate After the digital interface unit 12 has begun collecting data from the aircraft avionics systems in accordance with internal processor commands and instructions, periodic data processing and flight path extrapolation begins. The initial instruction to begin processing can take the form of a software call to begin a fixed command program, or through a hardware or firmware control line connected to the appropriate processor circuitry which automatically loads a starting process on power up or system reset.

The method of the invention proceeds in a step 46 with an examination of the data stored in or supplied to the GCAS global or shared memory 22 and a determination of an appropriate scale for received data. That is, data is received in a value adjusted state that is useful for the aircraft bus and instrumentation. However, the elements used to implement the method of the present invention can have a differing set of value bases so that they are independent of the sensors and equipment used in the aircraft, as well as employ a more efficient format or method for data transfer and manipulation. Therefore, data is adjusted in scale to provide the desired range of values for the remaining process and transferred, as requested, to appropriate processing sub-components.

To assure the proper range of values and limitations for data being processed, a current data value check or validation procedure is run called Data Validation. The data validation step, FIG. 2, 48, uses a rudimentary predictive process to determine whether received altimeter data is within reasonable bounds for previous aircraft conditions and operation. This prevents faulty data from blanking or propagating through the system and providing erroneous messages.

Figure 3:
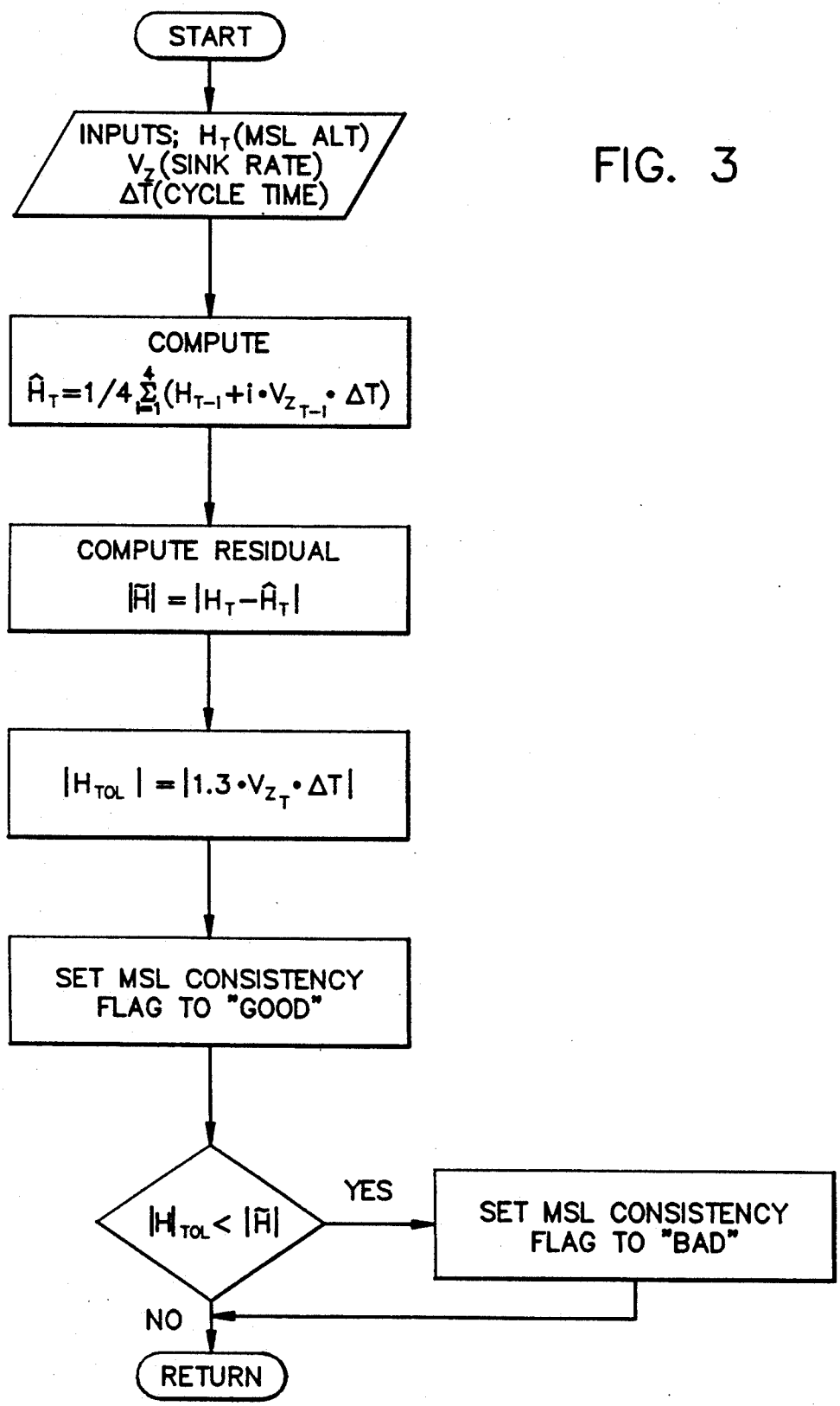
FIG. 3 illustrates a flowchart of method steps used for validating Height Above Mean Sea Level data for the system of FIG. 1.
Figure 4:
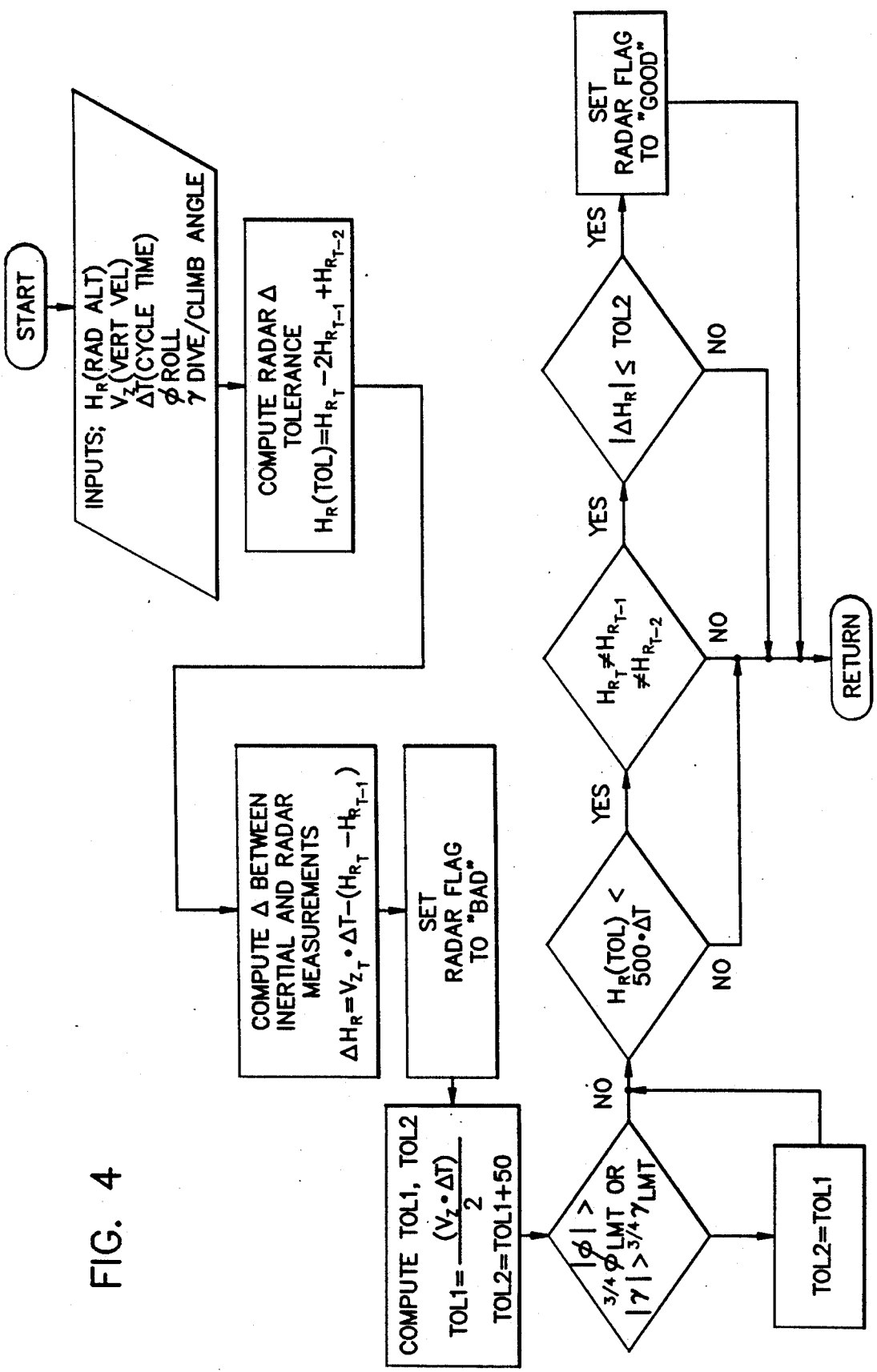
FIG. 4 illustrates a flowchart of method steps used for validating Height Above Ground Level data for the system of FIG. 1.

The data validation process is illustrated in further detail in FIGS. 3 and 4. As shown in FIGS. 3 and 4, a check of the altimeter data for validity is performed by computing a Height Above Mean Sea Level (HAMSL) value for acceptance and a Height Above Ground Level (HAGL) value for acceptance. Altimeter and vertical velocity or sink rate data is transferred from the shared data stored in memory 22 to a Data Validation (DVAL) unit 24 for accumulation and computation.

As each altimeter reading is received it is stored in a register or memory location for access during subsequent computational steps. The preferred embodiment uses the current altimeter measurement and at least four previous altitude measurements, although those skilled in the art will readily appreciate that more, or less, readings can be employed where additional circuitry and memory are available and other levels of predictive precision are desired. However, it has been found that the previous four measurements, when used in conjunction with the current measurement provides a sufficiently high level of accuracy in predictability and it is generally not cost effective nor efficient to increase the amount of data used.

The current altitude measurement is used to determine a coarse current altitude or vertical height position for the aircraft. The previous altitude measurements are used in combination with their corresponding measured sink rates to predict the validity of the current altitude measurement through a flight path extrapolation of the previous altitude measurements. This allows data verification of the current data before warnings are issued. That is, an altitude acceptance value is determined by both the current measurement and the averaged rate of ascent/decent for previous measurements which are taken as a generalized flight characteristic of the aircraft. This provides an altitude tolerance or guideline for data acceptance outside of which the data is assumed to be in error. This information is especially useful when taken in combination with response times and dive rates as discussed below.

The validity computations begin by multiplying each of the four previous vertical sink rates by the number of process cycles since they were collected and adding the resulting product to the corresponding altitude. This produces a theoretical "present" altitude for each of the four previous vertical sink rates. The four extrapolated altitude values are averaged to provide an average predicted altitude or height above mean sea level ($H_T$) over the previous four cycles. This according to the expression:

$$H_T = \frac{1}{4} \sum_{i=1}^{4} (H_{T-i} + i \cdot V_{ZT-i} \cdot \Delta T) \quad (1)$$

The current height above mean sea level measurement is then compared to or differenced with the above average predicted height. The absolute value of the difference between these two values provides a "residual" altitude value that represents the variation in previous data extrapolation from the present measurement and provides some indication of the variance in the data being presently collected. That is, the system or method of the present invention looks at what would be predicted for the HAMSL altitude based on the previous measurements and takes an averaged value as a guideline for current data acceptance. However, the previous values themselves may be slightly off and the aircraft can change its course dramatically. To assist in this problem the system also computes a tolerance factor $H_{TOL}$ which is compared against the residual value to decide if the data is valid.

The value of the tolerance factor $H_{TOL}$ is set at thirty percent over the current height displacement but not less than a predetermined constant value such as 5 to account for level flight. This is computed by multiplying the cycle time, $\Delta T$, by the current vertical sink rate, $V_{ZT}$, and applying an additional multiplication factor of 1.3. The absolute value of $H_{TOL}$ is compared to the absolute value of the residual H to determine if the HAMSL data is "bad". If the absolute value of H exceeds the absolute value of $H_{TOL}$ then the currently collected HAMSL data is assumed bad and not used for further processing. Instead the system acquires a new value on the next collection or sampling cycle.

In addition to the HAMSL altitude the altitude or height above terrain (HAGL) data is also validated in the processing step 48. The HAGL data is provided by conventional radar altimeters and is more complex in nature since it is inherently sensitive to other factors such as aircraft roll angle and dive/climb angle.

As shown in FIG. 4, an error tolerance factor, $H_R(TOL)$, similar to that for the HAMSL data is computed by differencing the present radar altitude measurement with the previous two measurements. Due to larger variations (typical) in terrain following altitudes than in the HAMSL data it is generally not efficient to include more than two previous altitude measurements in this computation.

The relationship used for verifying the sign change of the HAGL data is easily expressed as:

$$H_{R(TOL)} = H_{RT} - 2H_{RT-1} + H_{RT-2} \quad (2)$$

The next step is to compute the difference between the HAGL altitude or height changes predicted by the vertical sink rate and the measured change since the last data collection cycle. This is computed by the expression:

$$\Delta H_R = V_{ZT} \Delta T - (H_{RT} - H_{RT-1}) \quad (3)$$

At this point, the system assumes that the data is bad and sets a "bad" data flag or indicator value unless the data meets certain criteria. Naturally those skilled in the art will recognize that the bad data flag can be set after subsequent data manipulation or comparisons but would require more referrals to a flag register or the like and is more complex to implement.

Two additional HAGL tolerance values for the data are established based on the current sink rate and the magnitude of the aircraft bank and dive/climb angles. That is, the current aircraft vertical sink rate is used as a guide for accepting HAGL altitude data based on current dive/climb and roll angles due to the inoperability of radar altimeters when faced at substantial angles to the local terrain, or above certain altitudes. It is assumed that if the angle values are outside of certain ranges then the system must rely on the HAMSL data to perform satisfactorily.

Two limiting values are used in determining these tolerance values. The first is a limiting value for the roll angle $\phi$ which is set at 65 degrees and the second is the dive/climb angle which is set at 35 degrees. These values are adjusted for the specific aircraft.

The first tolerance value, TOL1, is set at fifty percent of the altitude change attributable to the sink rate over the cycle ΔT. The second tolerance value, TOL2, is initially set to be 50 feet more than TOL1.

The assumed radar data tolerance limits in relation to the aircraft dive/climb angle is 35 degrees and for roll angle is 65 degrees. These limits are adjusted for each aircraft type and altimeter system as research from time to time shows advisable. These factors are known to those skilled in the art of aircraft design. If the aircraft is outside of either of these limits and, therefore, outside of the radar altimeter antenna coverage then TOL2 is set equal to TOL1.

In either case, the system looks to see if the $H_R(TOL)$ value is less than a preset value of 500 feet times the update period ΔT. If it is, the radar data flag is left set at "bad" indicating that this data is unreliable for use by the GCAS 10. If the value of $H_R(TOL)$ is greater or equal to the test value, the system checks to see if level flight has occurred by checking to see if there has been no change in altitude for the two previous data collection periods. A zero change means the radar data flag is left set as "bad". Otherwise, the system looks to see if the absolute value the altitude change, $\Delta H_R$, is less than or equal to the value of TOL2. Provided this is true, the flag is set at "good" and the data is valid for the next processing steps.

Returning now to FIG. 2, once the status of altimeter measurements or data has been validated, the GCAS controller 20 uses this data as stored in the shared memory 22 to extrapolate the flight path for the aircraft in a step 50. The process for accomplishing this extrapolation and related computations is shown in flow chart form in FIG. 5.

Figure 5:
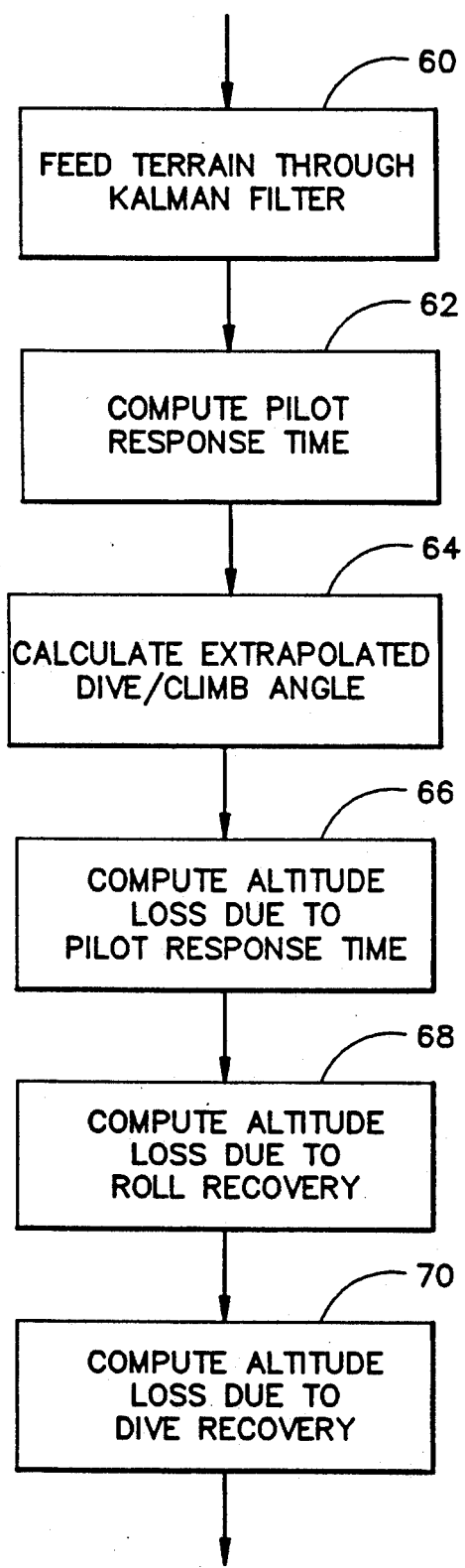
FIG. 5 illustrates a flowchart of method steps used in the data processing element of FIG. 1.

In FIG. 5, the GCAS 10 data processing unit 26 subjects the data to a terrain filtering step 60, and calculates pilot response time in step 62. This data then allows the extrapolation of dive/climb angle in step 64 and three computational steps for extrapolating altitude loss due to pilot response time, 66, roll recovery, 68, and dive recovery, 70. The data from each of these processing steps is then used to determine excessive terrain closure and warning criteria.

Figure 6A:
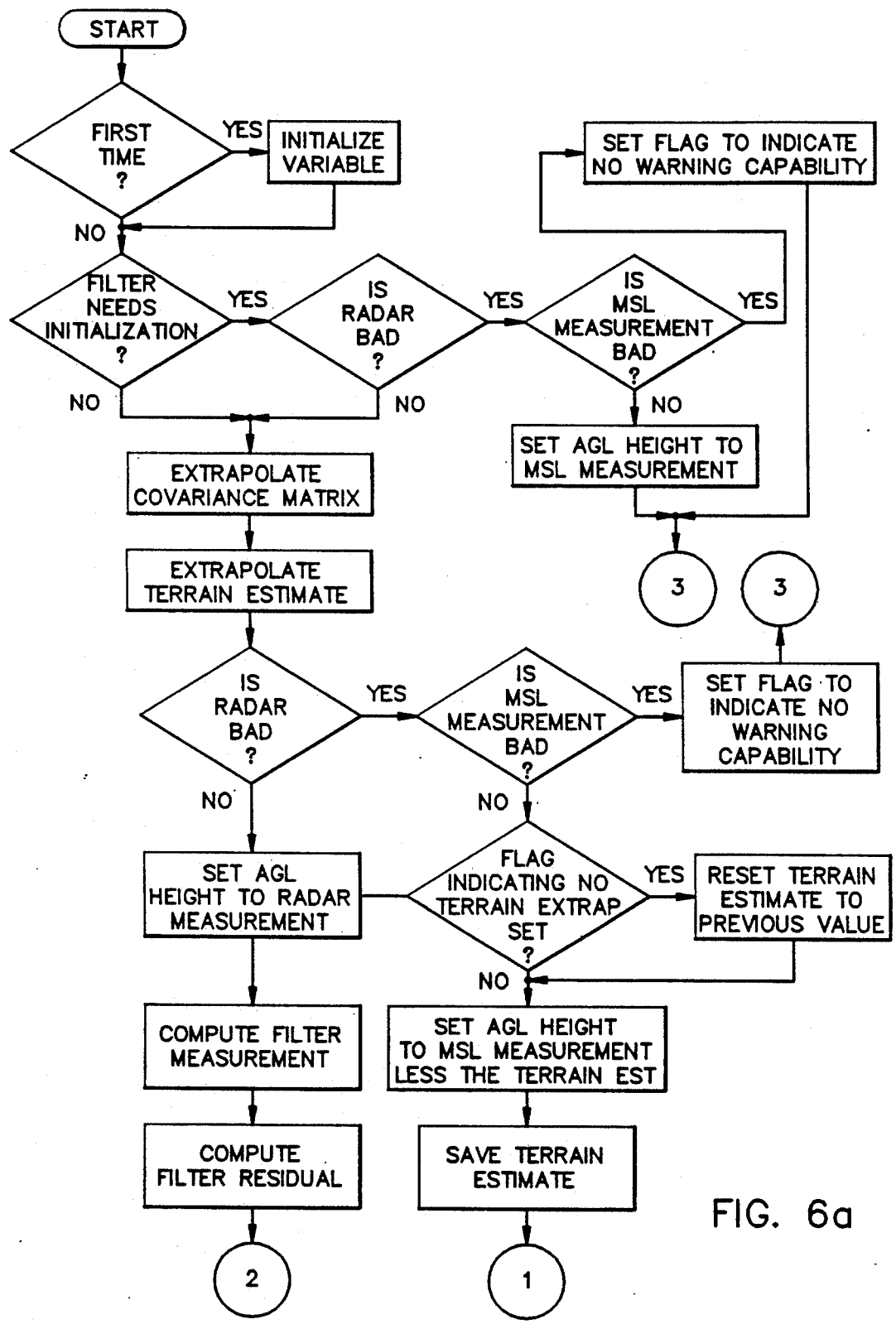
FIG. 6a illustrates a first portion of processing steps for data in a Kalman filter used in the method of FIG. 5.
Figure 6B:
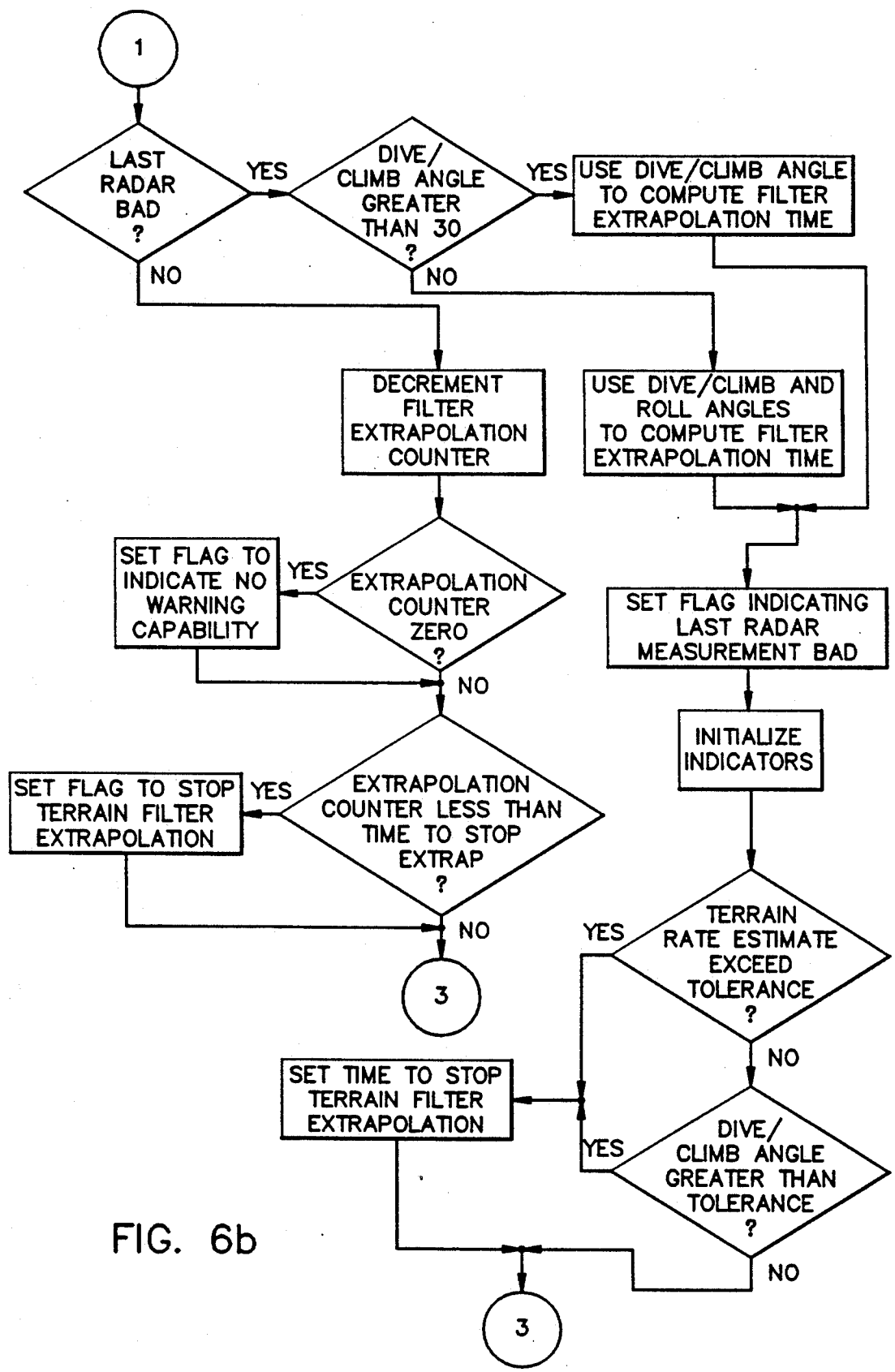
FIG. 6b illustrates a second portion of the processing steps for data in the Kalman filter used in the method of FIG. 5.
Figure 6C:
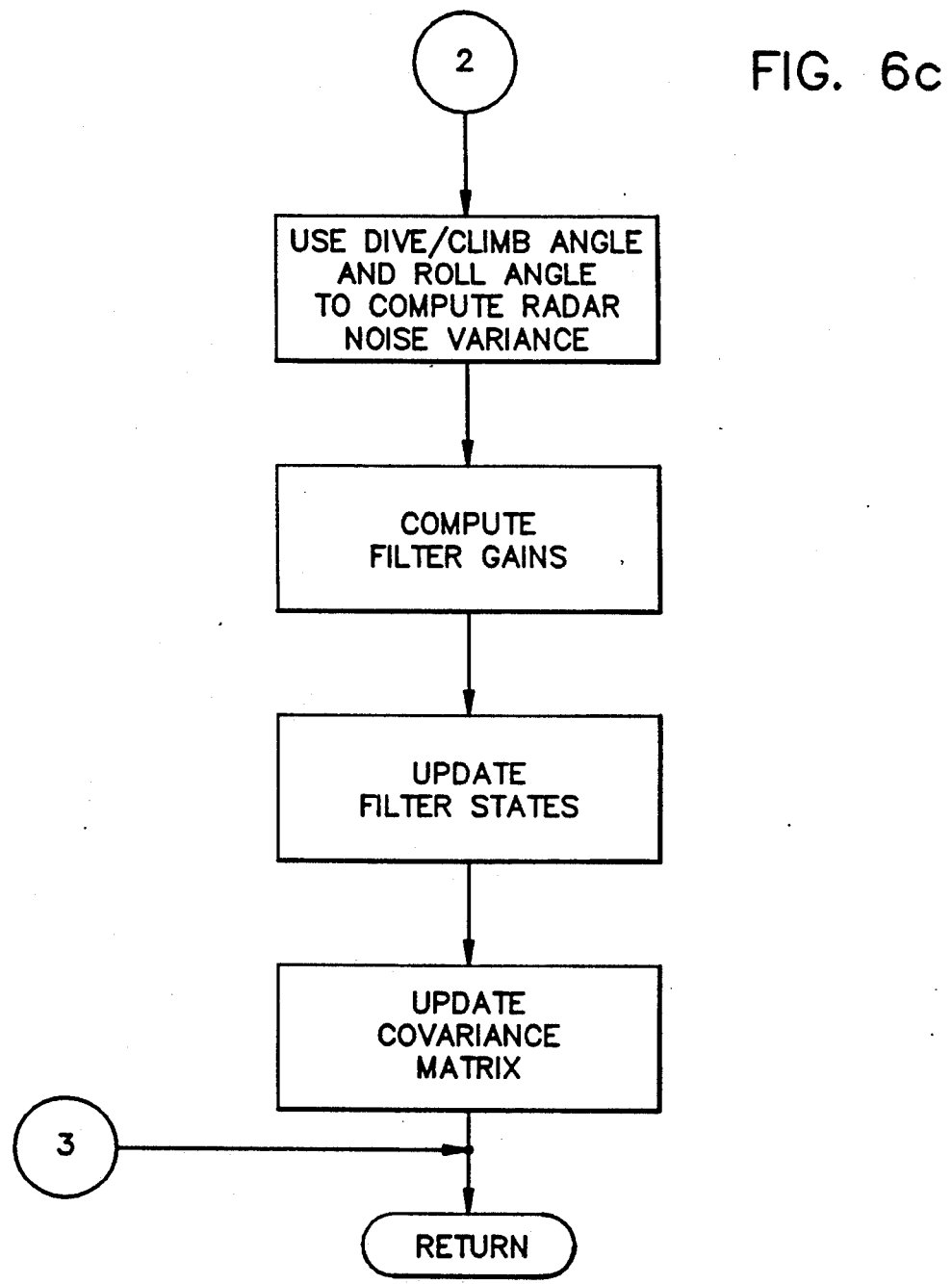
FIG. 6c illustrates a third portion of the processing steps for data in the Kalman filter used in the method of FIG. 5.

The terrain filtering of the collected data in step 60 is illustrated in further detail of the flow chart steps of FIGS. 6a-6c. A two state Kalman filter is used. Such filters are well understood in the art and, therefore, not described in explicit detail herein. A terrain heigth measurement is on output of the filter and a terrain change rate comprises the second state of the filter.

In FIG. 6, the terrain filtering process begins with initialization of any variables used. This would typically occur only after initial power-up of the GCAS 10 or under reset conditions. The Kalman filter also requires an initialization of values for the terrain. That is, after 5 cycles of good radar altimeter measurements, as determined by the previous DVAL unit 24 processing, the terrain filtering is considered initialized by those data values and used to filter the data according to new data received.

IF the Kalman filter needs initialization and the HAGL radar measurement flag has been set as bad in the data validation steps, then the GCAS 10 uses the HAMSL measurements. If the HAMSL data is also flagged by the DVAL unit 24 as being bad, then the GCAS 10 sets a flag to indicate no warning capability due to lack of valid data on which to base a filter. On the other hand, if the HAMSL data is "good" then the HAGL altitude is set using the HAMSL data and the system continues with processing.

If the radar altimeter data is good upon initialization or initialization is completed, the system extrapolates a covariance matrix, according to well understood principles, and provides an extrapolated terrain estimate. If the filter is already initialized, a second check of the radar altimeter data status is performed to see if it is "bad", in which case the HAMSL data status is also checked. If at this point the HAMSL data status is bad, a no warning capability indication is made. Otherwise, the HAGL value is set to the HAMSL value. That is, the alternative value for the HAGL data is used when the HAGL data is unacceptable, the HAMSL data is acceptable and the terrain filter has been initialized.

After initialization of the filter, good radar altimeter data is used to set the AGL height measurement and then a filter measurement and filter residual are computed. The dive/climb angle is sued to compute radar noise variance so that filter gains can be computed and the filter states and covariance matrix updated before returning to the next processing step.

If the radar data is bad after initialization and the HAMSL data status is good the system checks to see if a no terrain extrapolation flag has been set. If no flag is set, the AGL height is set to the HAMSL measurement less a terrain estimate. The terrain estimate is saved for future processing.

If the radar measurement is flagged as bad, a filter extrapolation counter is decremented. When the extrapolation counter reaches zero a no warning capability flag or indicator is set. Otherwise, the extrapolation counter is compared to a preset time for stopping extrapolation and a stop flag or indicator is set when this value is obtained. The data processing unit 26 then returns to the next processing step.

If after extrapolating the estimated terrain in step 60 the GCAS 10 sees that the last radar data status was good, the dive/climb angle is checked to see if it is outside a preferred 30 degree window. If the dive/climb angle is greater than the 30 degree limit it is used to determine filter extrapolation time. However, when the aircraft is diving or climbing at lesser angles, the dive/climb angle information is combined with roll angle data to determine the filter extrapolation time.

The length of time the filter uses an extrapolated terrain estimate to compute an alternative AGL measurement depends on the aircraft bank and dive/climb angles. This time increases as the bank angle increases and decreases as the roll angle decreases. That is, as the radar is moved to a proper or better angle with respect to the terrain a terrain estimate is no longer needed. However, as the aircraft altitude exceeds useful radar altitude or the dive angle places the radar at an ineffective angle to the terrain, the terrain estimate is needed.

A flag is used to set the radar measurement as "bad", various other indicators are initialized, and the change in terrain altitude and dive/climb angle are each compared to previously computed tolerance values. If either current value exceeds the tolerance levels then the terrain filter extrapolation is terminated. Otherwise, the processing unit proceeds to the step 62 for determination of pilot response time.

Figure 7:
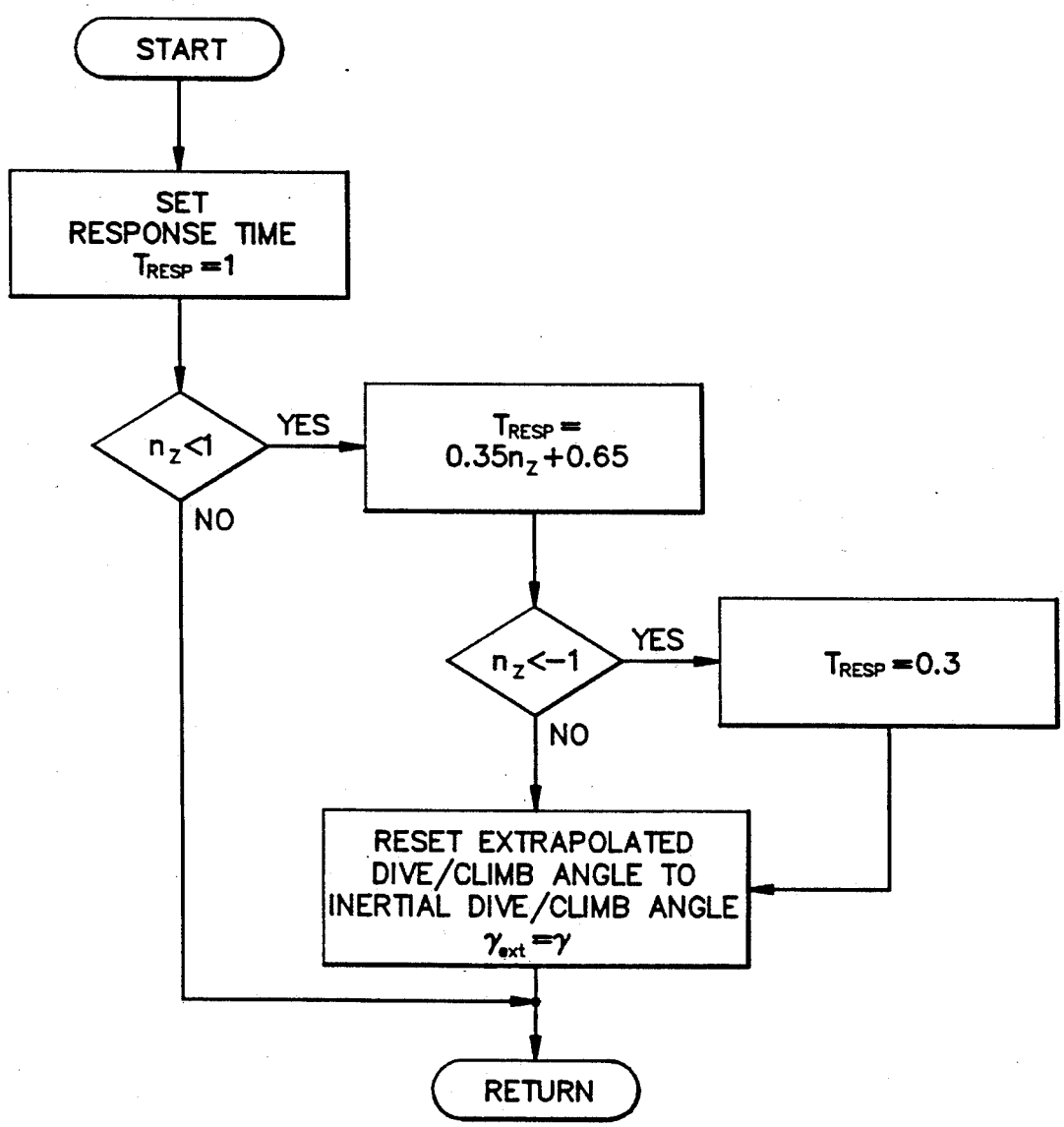
FIG. 7 illustrates a flow chart for data processing steps used in computing pilot response time in the method of FIG. 5.

The method used by the data processing unit 26 of the GCAS 10 to compute pilot response time is illustrated in FIG. 7. As shown in FIG. 7, the pilot response time is computed as a function of the aircraft normal acceleration, $n_Z$. This relationship is used to account for a pilot's ability to respond quickly to a warning when there is less than 1 g acceleration but slower when acceleration exceeds one or more g's.

To compute pilot response time an initial value response is chosen. In the preferred embodiment, the initial value is about 1 second. This value is not absolute for the processing of the present invention and other values can be used based on aircraft and pilot experience. The current aircraft normal acceleration is taken from the shared data in memory 22 and checked to see if it is less than a preselected limit. In the preferred embodiment, this limit is chosen as 1 g. If normal acceleration is not less than 1 g, the pilot response is left at the initial maximum value of 1 second. On the other hand, if normal acceleration is less than 1 g, the response time is linearly decreased by multiplying the current acceleration value, $n_z$, by a 35 percent adjustment factor (0.35) and adding to 0.65 to yield a new pilot response time. If the current acceleration value is not only less than 1 but also less than a second lower limiting value, here −1 g, then the pilot response time is reset to a minimum level of about 0.3 seconds.

If normal acceleration is less than 1, the extrapolated dive/climb angle, $\gamma_{ext}$, is also reset to be the measured inertial dive/climb angle, $\gamma$. Using the above approach, pilot response time is linearly decreased as the aircraft loading decreases below 1 g.

Figure 8A:
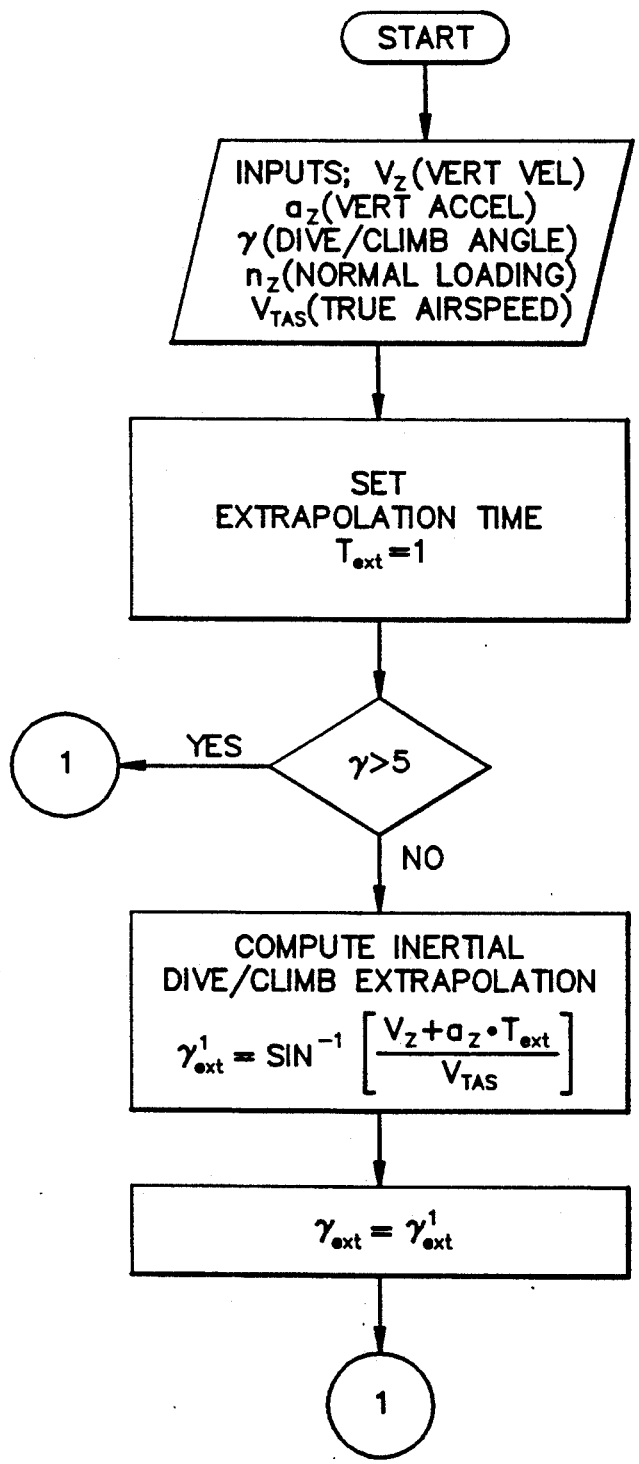
FIG. 8a illustrates a flow chart of data processing steps for extrapolating dive/climb angle recovery in the method of FIG. 5.
Figure 8B:
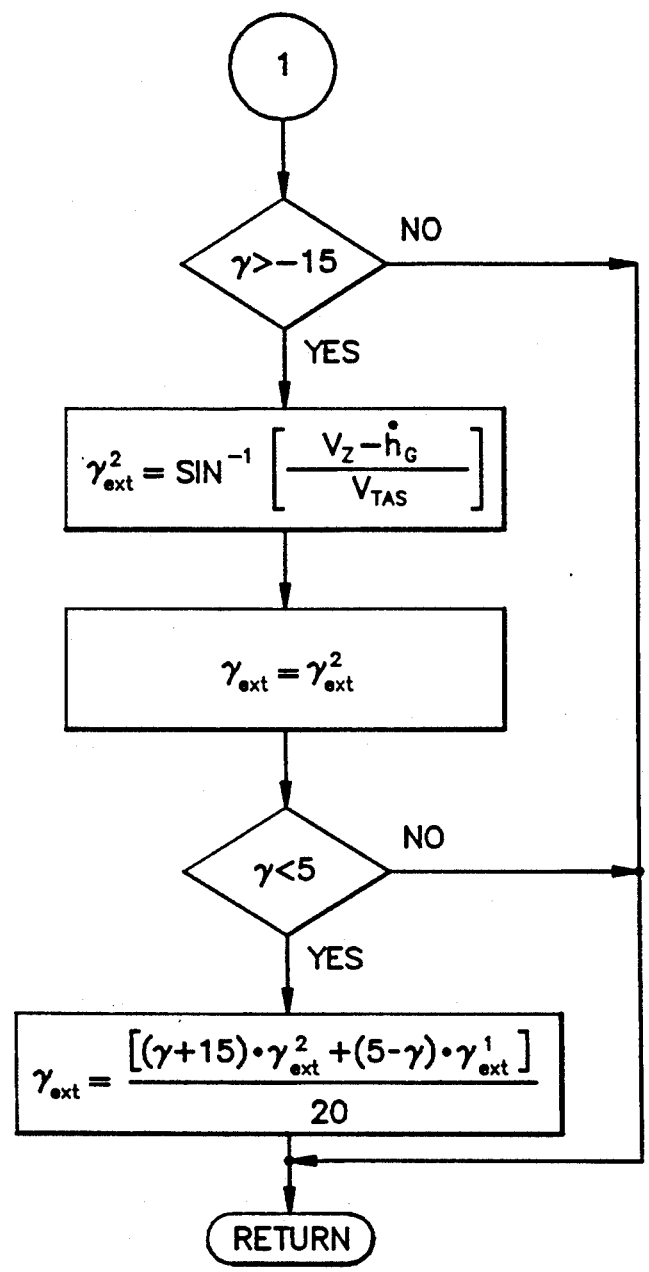
FIG. 8b illustrates a flow chart of additional data processing steps for extrapolating dive/climb angle recovery in the method of FIG. 5.

The method used by the data processing unit 26 of the GCAS 10 to extrapolate the dive/climb angle in processing step 64 is illustrated in FIGS. 8a and 8b. The dive extrapolation uses an extrapolated velocity vector that is tangent to the horizontal plane. This vector is computed from aircraft vertical acceleration and estimated terrain change.

As shown in FIG. 8, the dive/climb extrapolation angle uses the vertical sink rate or velocity, vertical acceleration, dive/climb angle, terrain rate estimate, and true air speed, data retrieved from the shared memory, and a local data base for this process. Initially a dive/climb extrapolation time is set at 1.

Two special case values of dive/climb angle extrapolation are computed. One is the extrapolation for vertical acceleration, $\gamma_{ext}^1$, and the second is for vertical decent toward terrain, $Y_{ext}^2$. These values are expressed according to the relationships:

$$\gamma_{ext}^1 = \sin^{-1}\left[\frac{(V_Z + a_Z \cdot T_{ext})}{V_{TAS}}\right] \quad (4)$$

and $$\gamma_{ext}^2 = \sin^{-1}\left[\frac{(V_Z - h_G)}{V_{TAS}}\right] \quad (5)$$

where
$V_Z$ is vertical sink rate or velocity;
$a_Z$ is vertical acceleration;
$\gamma_{ext}$ is an extrapolated dive/climb angle;
$h_G$ is a terrain rate estimate; and
$V_{TAS}$ is true air speed.

The value of the extrapolation for the dive/climb angle is dependent upon the value of the current measured dive/climb angle. That is, the current value establishes a criteria used to select from among three different methods of extrapolating the angle. If the current measured dive/climb angle is less than −15 degrees then the aircraft is in a vertical acceleration mode and the extrapolation value is taken as $\gamma_{ext}^1$. If, however, the value of the the dive/climb angle is greater than 5, then the aircraft is angled toward the terrain with fast closure and the extrapolation is taken as the value of $\gamma_{ext}^2$. Otherwise, the extrapolation value is the weighted combination of the two special cases and is based on the relationship:

$$\gamma_{ext} = \frac{[(\gamma + 15)\gamma_{ext}^2 + (5 - \gamma) \cdot \gamma_{ext}^1]}{20} \quad (6)$$

Figure 9:
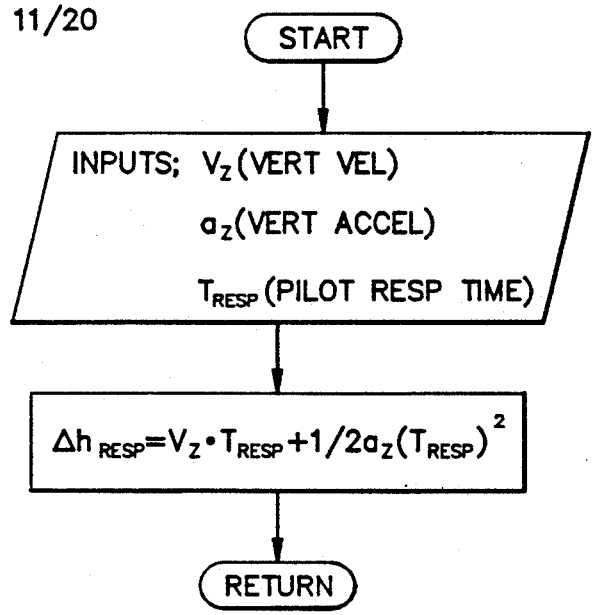
FIG. 9 illustrates a flow chart for processing steps used in the method of FIG. 5 for computing altitude loss due to pilot response time.

The method used by the data processing unit 26 of the GCAS 10 to extrapolate the altitude loss resulting from pilot response time of step 66 is next illustrated in FIG. 9. As shown in FIG. 9, the pilot response time, $T_{RESP}$, from processing step 62, is used along with the vertical velocity or sink rate, $V_Z$, and vertical acceleration, $a_z$, to extrapolate the loss in altitude expected from the current aircraft operational characteristics by the time the pilot responds. A constant vertical acceleration is assumed although a variable rate could be used.

The altitude loss, $h_{RESP}$, is computed by multiplying the current sink rate by the pilot response time and adding one-half the product of the vertical acceleration and the response time squared. The resulting extrapolated altitude loss due to pilot response time is stored for later use.

Figure 10:
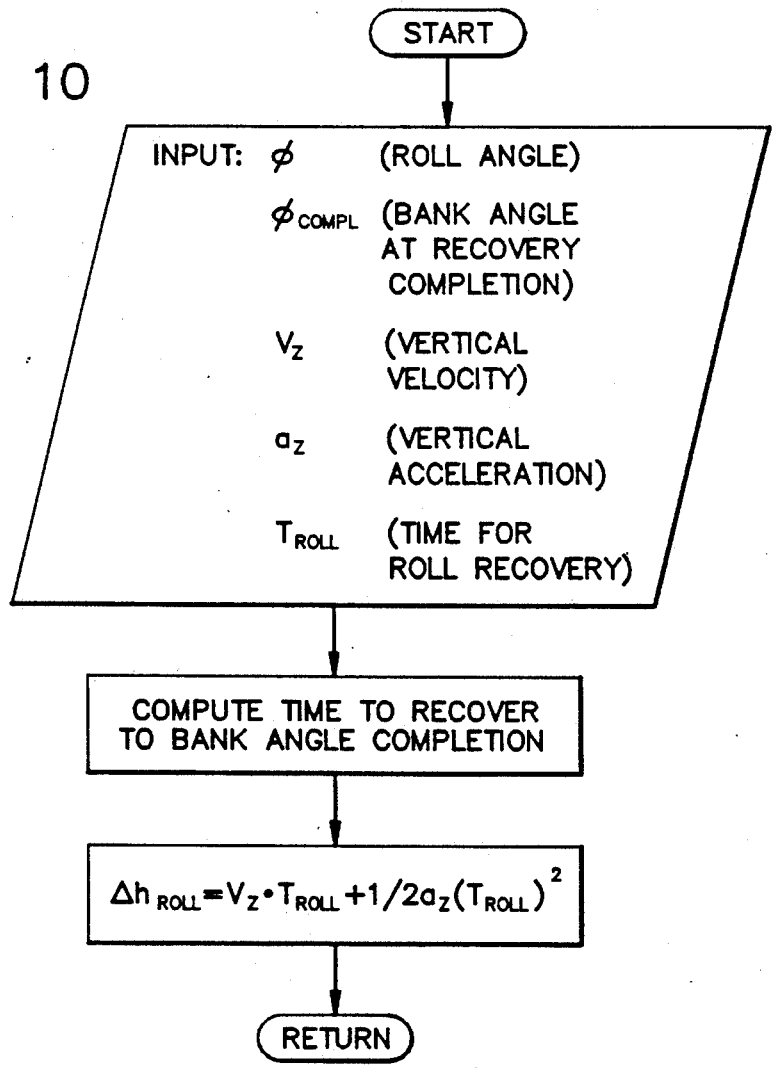
FIG. 10 illustrates a flow chart for processing steps used in the method of FIG. 5 for computing altitude loss due to roll recovery.

The method used by the data processing unit 26 of the GCAS 10 to extrapolate the altitude loss resulting from roll recovery in step 68 is illustrated in FIG. 10. As shown in FIG. 10, the GCAS 10 uses the current roll angle and bank angle associated with roll recovery completion along with vertical acceleration and sink rate, and time for roll recovery to compute a time for roll recovery and then the loss in altitude that occurs until the aircraft to recovers from the roll.

These computations use knowledge of an aircraft's roll rate performance capabilities and the bank angle at the time of data processing. Each aircraft has roll characteristics that are known in the art and easily modeled for use in the collision system 10. The values presented below are especially applicable to the F/A-18 type aircraft and similar tactical fighters. The vertical acceleration is considered constant.

The time for roll recovery completion, $T_{ROLL}$, is defined by the collision avoidance system 10 to be the time it takes to reduce the aircraft bank angle $\phi$ to within a predetermined number of degrees of level flight. The value chosen is based on aircraft flight characteristics and usage, again commercial versus military. In the preferred embodiment, $T_{ROLL}$ is determined with reference to the time it takes to bring the aircraft within 30 degrees of level flight which is well suited for F/A-18 type military aircraft. Also, the preferred computation process uses five distinct bank angle regimes to compute the recovery period, 30-60 degrees, 60-90 degrees, 90-115 degrees, 115-130 and 130-180 degrees regardless of the bank direction. Those skilled in the art will readily understand that more, or less, angle regimes or divisions can be used based on available flight data developed over time.

The roll recovery period is computed according to the expression:

$$T_{ROLL} = \frac{(T_2 - T_1)}{DEN} \cdot (|\phi| - ABB) + T_1 \quad (7)$$

where

ABB is the minimum angle for a given angular range;
DEN is the magnitude of the range; and
the values preassigned for each roll angel regime are:

$0 \leq |\phi| \leq 30$  $T_{ROLL} = 0$ $30 \leq |\phi| \leq 60$  $T_2 = -0.002 \cdot V_{EAS} + 1.7$
$T_1 = -0.001 \cdot V_{EAS} + 0.8$
$DEN = 30; ABB = 30$ $60 \leq |\phi| \leq 90$  $T_2 = -0.0015 \cdot V_{EAS} + 2.1$
$T_1 = -0.002 \cdot V_{EAS} + 1.7$
$DEN = 30; ABB = 60$ $90 \leq |\phi| \leq 115$  $T_2 = -0.003 \cdot V_{EAS} + 3.1$
$T_1 = -0.0015 \cdot V_{EAS} + 2.1$
$DEN = 25; ABB = 90$ $115 \leq |\phi| \leq 130$  $T_2 = -0.0025 \cdot V_{EAS} + 3.1$
$T_1 = -0.003 \cdot V_{EAS} + 3.1$
$DEN = 15; ABB = 115$ $130 \leq |\phi| \leq 180$  $T_2 = -0.001 \cdot V_{EAS} + 2.5$
$T_1 = -0.0025 \cdot V_{EAS} + 3.1$
$DEN = 51; ABB = 130$ where $V_{EAS}$ is the equivalent airspeed.

This information is then used to extrapolate an estimated loss in altitude that occurs during recovery from a roll according to the expression:

$$\Delta h_{ROLL} = V_z(T_{ROLL}) + \tfrac{1}{2} a_z(T_{ROLL})^2 \qquad (8)$$

However, in the preferred embodiment the value of $\Delta h_{ROLL}$ is set to zero where the roll rate of the aircraft is greater than 80 degrees per second. Alternate roll rates are used where desired as determined by the flight characteristics of the specific aircraft. The value for $\Delta h_{ROLL}$ is stored in a memory location for later retrieval.

Figure 11:
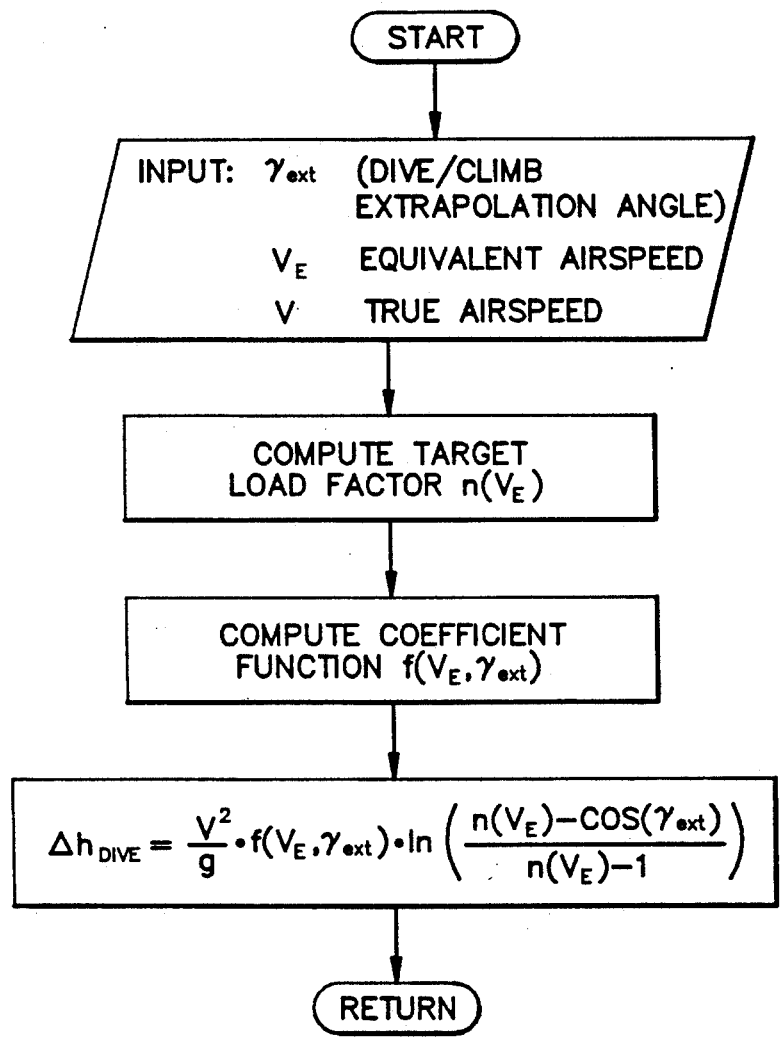
FIG. 11 illustrates a flow chart for processing steps used in the method of FIG. 5 for computing altitude loss due to dive recovery.

The method used by the data processing unit 26 of the GCAS 10 to extrapolate the expected loss in altitude during a dive recovery in step 70 is illustrated in FIG. 11. The recovery is computed assuming a constant normal load on the aircraft and models normal load transition from the current load value, in g's, to a target loading value or factor n(V_E). This depends on the aircraft's ability to achieve a given target loading for the indicated airspeed and dive/climb angle. This factor represents a limitation on the aircraft airframe and possibly on aircraft personnel in terms of the stress forces placed on systems. Each aircraft has predefined limitations that are understood in the industry.

The GCAS 10 can periodically compute a target load condition based on the current status of the aircraft flight path and other factors. In addition, if the aircraft remains in a dynamically stable configuration for at least five update cycles, the system will take account of weight changes in computing loading limitations. That is, provided the aircraft is stable enough for a sufficient time, then changes in weight due to loss of excess fuel, weapons discharge, or other weight losses can be accommodated in the computation of loading.

Figure 12A:
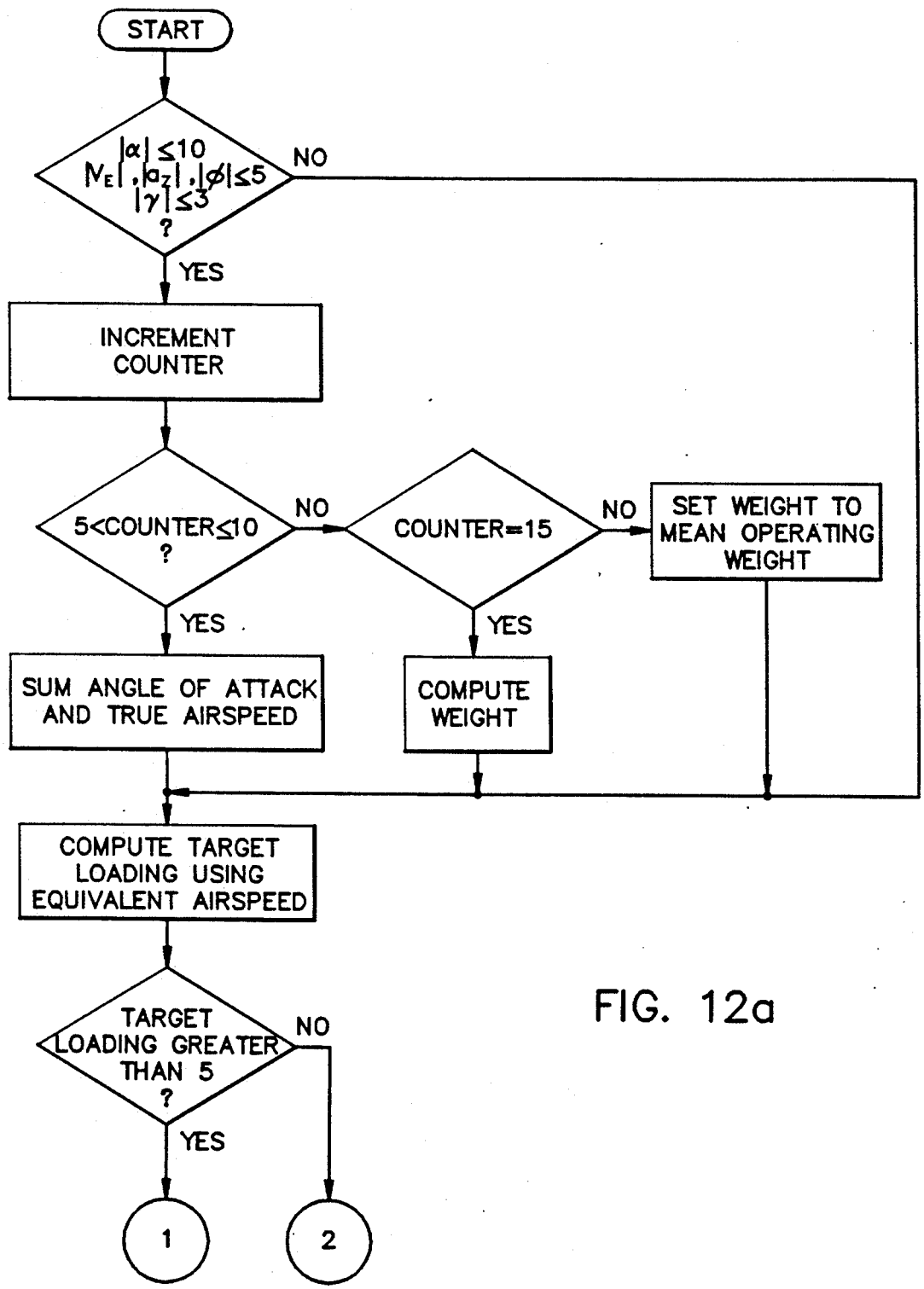
FIG. 12a illustrates a flow chart for a portion of the processing steps used in the method of FIG. 5 for computing aircraft target loading.
Figure 12B:
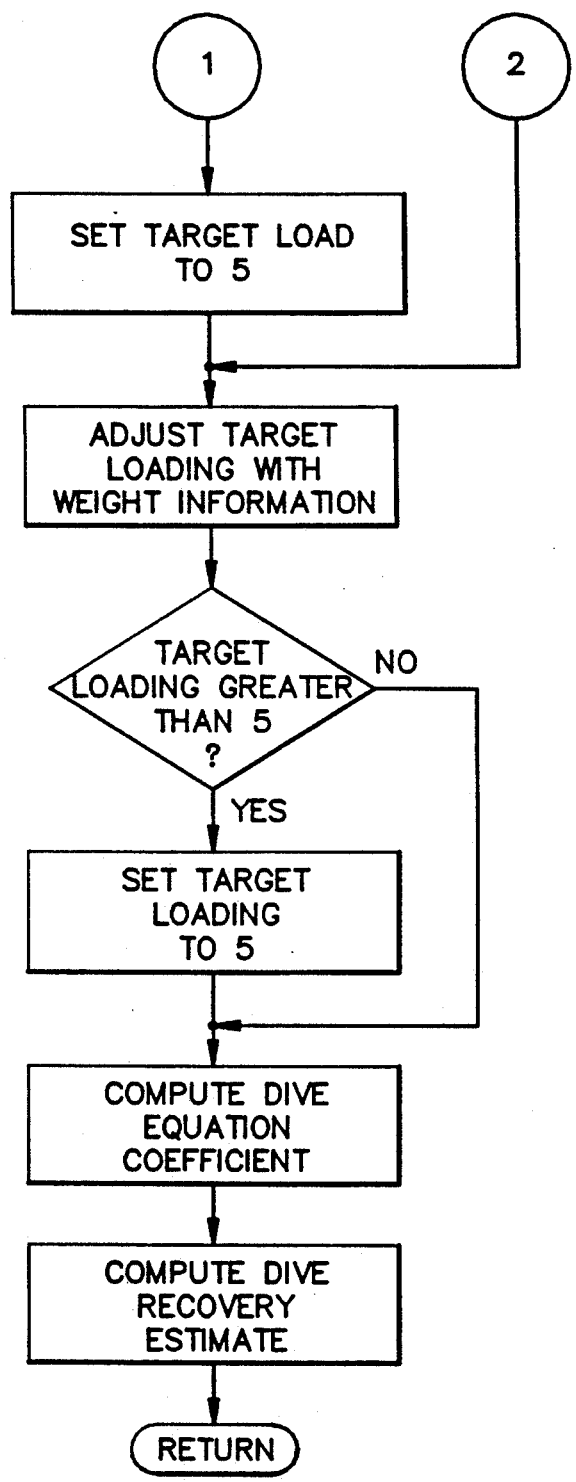
FIG. 12b illustrates a flow chart for a second portion of the processing steps used in the method of FIG. 5 for computing aircraft target loading.

The target load factor, $n(V_E)$ is computed in accordance with the steps illustrated in FIGS. 12a and 12b.

The target load is represented as a function of equivalent airspeed and weight. It is approximately eighty-five percent of the aircraft's g-available with an upper limit of 5 g's. In FIG. 12, the GCAS 10 first verifies if the current angle of attack, $\alpha$, is less than 10 degrees; if the absolute value of the acceleration, the vertical sink rate and $\phi$ are each equal to or less than 5; and if the dive/climb angle is less than or equal to 3 degrees. If these factors or criteria are obtained, then the processing unit 26 increments a cycle counter, otherwise the processing unit computes loading based solely on equivalent air speed.

If the above factors or values were obtained then the cycle counter is set, and where the counter has a value greater than 5 but less than 10, the angle of attack and true air speed are summed. Where the counter has a value above 10, the mean operating weight of the aircraft is stored in a register or memory location and for a counter value of 15 the actual aircraft weight is computed.

If the aircraft normal loading is greater than 5 then a target load value is set to 5. If the aircraft normal acceleration value is less than 5 then weight factors are used to adjust target loading with a top value of 5 again being imposed. With these values established and stored the dive equation coefficients and dive recovery estimate are computed.

The coefficient function $f(V_{EAS}, \gamma_{ext})$ is computed according to the relationships illustrated in mathematical Appendix I. In the Appendix I, $B(V_{EAS})$ represents a base coefficient with $U(V_{EAS})$ an upper percentage bound and $L(V_{EAS})$ a lower percentage bound for the computed dive coefficients. The base coefficient is a preconditioned dive coefficient that is adjusted by multiplying by the computed percentage from the upper and lower bounds.

As shown in Appendix I, the Base coefficient comprises a velocity constant, $V_y$ plus the product of a slope function value $V_s$ and the equivalent airspeed. The upper and lower bound functions each further comprise a constant value $P_y$ and the product of a slope function $P_s$ and the equivalent airspeed. Other constants or values used are shown in Appendix I. An exemplary set of values or data base used to compute the function $f(V_{EAS}, \gamma)$ are shown in TABLES II and III below. Note that once L exceeds a value of 10, the slope function goes to 0 and the constant function obtains a value of 100. These values were developed for an F/A-18 military aircraft and can be adjusted for other types of aircraft as would be known by those skilled in the art.

The extrapolation of the altitude change, or loss, due to a dive is expressed as:

$$\Delta h_{DIVE} = \frac{V^2}{g} \cdot f(V_{EAS}, \gamma_{ext}) \cdot \ln\left[\frac{n(V_E) - \cos(\gamma_{ext})}{n(V_E) - 1}\right] \qquad (9)$$

where g is the gravitational acceleration constant. The GCAS 10 computes this value and stores it in a register or memory location for use by the warning unit 28.

TABLE II

| | K = 1 ($V_{EAS} \leq 325$ knots) | | |
|---|---|---|---|
| | I = 1 | I = 2 | I = 3 |
| L = 1 | $P_s$ = 3.3725259 | $P_s$ = 3.0626570 | $P_s$ = 3.4082630 |
| L = 2 | $P_s$ = 1.4058667 | $P_s$ = 1.2635356 | $P_s$ = 1.4294378 |
| L = 3 | $P_s$ = 0.8869422 | $P_s$ = 0.7950059 | $P_s$ = 0.9155578 |

TABLE II-continued

| | K = 1 ($V_{EAS} \leq$ 325 knots) | | |
|---|---|---|---|
| | I = 1 | I = 2 | I = 3 |
| L = 4 | $P_s$ = 0.4719230 | $P_s$ = 0.4108007 | $P_s$ = 0.4994078 |
| L = 5 | $P_s$ = 0.2946704 | $P_s$ = 0.2556896 | $P_s$ = 0.3322207 |
| L = 6 | $P_s$ = 0.1941726 | $P_s$ = 0.1691370 | $P_s$ = 0.2391237 |
| L = 7 | $P_s$ = 0.1303556 | $P_s$ = 0.1128000 | $P_s$ = 0.2347896 |
| L = 8 | $P_s$ = 0.0837970 | $P_s$ = 0.0734674 | $P_s$ = 0.1178081 |
| L = 9 | $P_s$ = 0.0494311 | $P_s$ = 0.0433252 | $P_s$ = 0.1179770 |
| L = 10 | $P_s$ = 0.0220652 | $P_s$ = 0.0195170 | $P_s$ = 0.1694407 |
| L = 11 | $P_s$ = 0.0 | $P_s$ = 0.0 | $P_s$ = 0.0 |
| L = 12 | $P_s$ = 0.0 | $P_s$ = 0.0 | $P_s$ = 0.0 |
| | $V_s$ = 0.0016835 | $V_s$ = 0.0016134 | $V_s$ = 0.0004838 |
| L = 1 | $P_y$ = −286.099730 | $P_y$ = −292.715330 | $P_y$ = −364.278260 |
| L = 2 | $P_y$ = −98.040967 | $P_y$ = −80.613156 | $P_y$ = −115.386580 |
| L = 3 | $P_y$ = −34.631622 | $P_y$ = −22.880526 | $P_y$ = −48.399278 |
| L = 4 | $P_y$ = 25.249237 | $P_y$ = 33.642459 | $P_y$ = 14.512122 |
| L = 5 | $P_y$ = 52.343430 | $P_y$ = 57.659370 | $P_y$ = 40.951859 |
| L = 6 | $P_y$ = 68.232607 | $P_y$ = 71.480263 | $P_y$ = 56.069696 |
| L = 7 | $P_y$ = 78.408736 | $P_y$ = 80.714100 | $P_y$ = 50.287670 |
| L = 8 | $P_y$ = 86.037863 | $P_y$ = 87.294393 | $P_y$ = 79.237852 |
| L = 9 | $P_y$ = 91.698589 | $P_y$ = 92.449215 | $P_y$ = 70.678663 |
| L = 10 | $P_y$ = 96.296215 | $P_y$ = 96.571063 | $P_y$ = 54.224359 |
| L = 11 | $P_y$ = 100.0 | $P_y$ = 100.0 | $P_y$ = 100.0 |
| L = 12 | $P_y$ = 100.0 | $P_y$ = 100.0 | $P_y$ = 100.0 |
| | $V_y$ = 0.6622517 | $V_y$ = 0.6427250 | $V_y$ = 0.8771194 |

TABLE III

| | K = .2 ($V_{EAS} >$ 325 knots) | | |
|---|---|---|---|
| | I = 1 | I = 2 | I = 3 |
| L = 1 | $P_s$ = −0.5259847 | $P_s$ = −0.5337375 | $P_s$ = −0.4557004 |
| L = 2 | $P_s$ = −0.2326073 | $P_s$ = −0.2500899 | $P_s$ = −0.2133684 |
| L = 3 | $P_s$ = −0.1603022 | $P_s$ = −0.1770491 | $P_s$ = −0.1506891 |
| L = 4 | $P_s$ = −0.0 | $P_s$ = −0.0934938 | $P_s$ = −0.0711826 |
| L = 5 | $P_s$ = −0.2946704 | $P_s$ = −0.0587011 | $P_s$ = −0.0376712 |
| L = 6 | $P_s$ = −0.1941726 | $P_s$ = −0.0384734 | $P_s$ = −0.0179851 |
| L = 7 | $P_s$ = −0.1303556 | $P_s$ = −0.0251989 | $P_s$ = −0.0357181 |
| L = 8 | $P_s$ = −0.0837970 | $P_s$ = −0.0163571 | $P_s$ = −0.0200687 |
| L = 9 | $P_s$ = −0.0494311 | $P_s$ = −0.0096313 | $P_s$ = −0.0118134 |
| L = 10 | $P_s$ = −0.0220652 | $P_s$ = −0.0043040 | $P_s$ = −0.0016872 |
| L = 11 | $P_s$ = 0.0 | $P_s$ = 0.0 | $P_s$ = 0.0 |
| L = 12 | $P_s$ = 0.0 | $P_s$ = 0.0 | $P_s$ = 0.0 |
| | $V_s$ = −0.0004752 | $V_s$ = −0.0002741 | $V_s$ = −0.0001910 |
| L = 1 | $P_y$ = 980.91624 | $P_y$ = 879.11287 | $P_y$ = 891.50983 |
| L = 2 | $P_y$ = 434.46308 | $P_y$ = 411.31511 | $P_y$ = 418.52543 |
| L = 3 | $P_y$ = 305.72281 | $P_y$ = 293.03734 | $P_y$ = 298.13096 |
| L = 4 | $P_y$ = 208.51937 | $P_y$ = 197.53818 | $P_y$ = 199.98324 |
| L = 5 | $P_y$ = 167.35521 | $P_y$ = 159.83634 | $P_y$ = 161.16675 |
| L = 6 | $P_y$ = 144.13094 | $P_y$ = 138.95366 | $P_y$ = 139.63005 |
| L = 7 | $P_y$ = 129.44826 | $P_y$ = 125.56375 | $P_y$ = 138.20270 |
| L = 8 | $P_y$ = 118.85493 | $P_y$ = 116.48735 | $P_y$ = 124.04782 |
| L = 9 | $P_y$ = 111.06605 | $P_y$ = 109.66007 | $P_y$ = 112.86056 |
| L = 10 | $P_y$ = 104.96169 | $P_y$ = 104.31289 | $P_y$ = 109.84095 |
| L = 11 | $P_y$ = 100.0 | $P_y$ = 100.0 | $P_y$ = 100.0 |
| L = 12 | $P_y$ = 100.0 | $P_y$ = 100.0 | $P_y$ = 100.0 |
| | $V_y$ = 1.3638282 | $V_y$ = 1.2561536 | $V_y$ = 1.0964162 |

Once the various flight path extrapolations and terrain filtering steps have been performed by the data processing unit 26 in the steps 60-70 of FIG. 5, the results are used to provide warning message status to the aircraft pilot or other on board processing systems. This is accomplished by the GCAS process controller retrieving and transferring appropriate data and processing status flags as well as altitude computational results to a warning unit 28. As shown in FIG. 2, the warning unit 28 interprets the data to determine warning status in a step 52, select a message in a step 54, and transfer a message to the output unit 30 in a step 56. A preferred operation of the warning unit 28 in implementing these steps is illustrated in FIGS. 13a-13e.

The warning unit 28 detects or computes a total recovery altitude estimated by the data processing unit 26, computes a safety buffer of approximately 12.5 percent of the roll and dive recovery extrapolated values, and increments counters which control warning message suppression and message transfer. The default output is a suppression of all audio, visual, or aural commands and messages.

When the aircraft falls below the estimated total recovery for three consecutive data cycles or sampling periods a warning message is transferred to a voice synthesizer or similar device 30. Subsequent messages are suppressed until a period of 5 seconds has elapsed. Those skilled in the art will readily understand that alternative time delays can be selected according to the aircraft system and usage. Commercial aircraft may require more continuous warning output whereas warning messages broadcast too close together in military aircraft present the "over" information problem previously discussed.

Each warning message is normally transferred to a voice synthesizer twice with a timed delay between transfers. The voice synthesizer then presents an aural message for the pilot to hear. In the preferred embodiment, a printed or visual message identical to the aural message is transferred to a head-up-display (HUD) system for display. Also lights or other indicators can be used.

In the preferred embodiment, the available warning messages are "PULL-UP", "UPSLOPE", and "ALTITUDE". The "PULL-UP" message is provided only when warning criteria is satisfied but neither of the other two messages are selected. The "UPSLOPE" message is an optional message that is selected when the warning criteria is satisfied and the extrapolated dive/climb angle uses the terrain rate information. The "ALTITUDE" message is provided whenever an aircraft's height above ground falls below the current minimum altitude buffer. This message suppresses all other messages until the aircraft flies above the minimum altitude but is only broadcast once per minimum altitude violation.

Figure 13A:
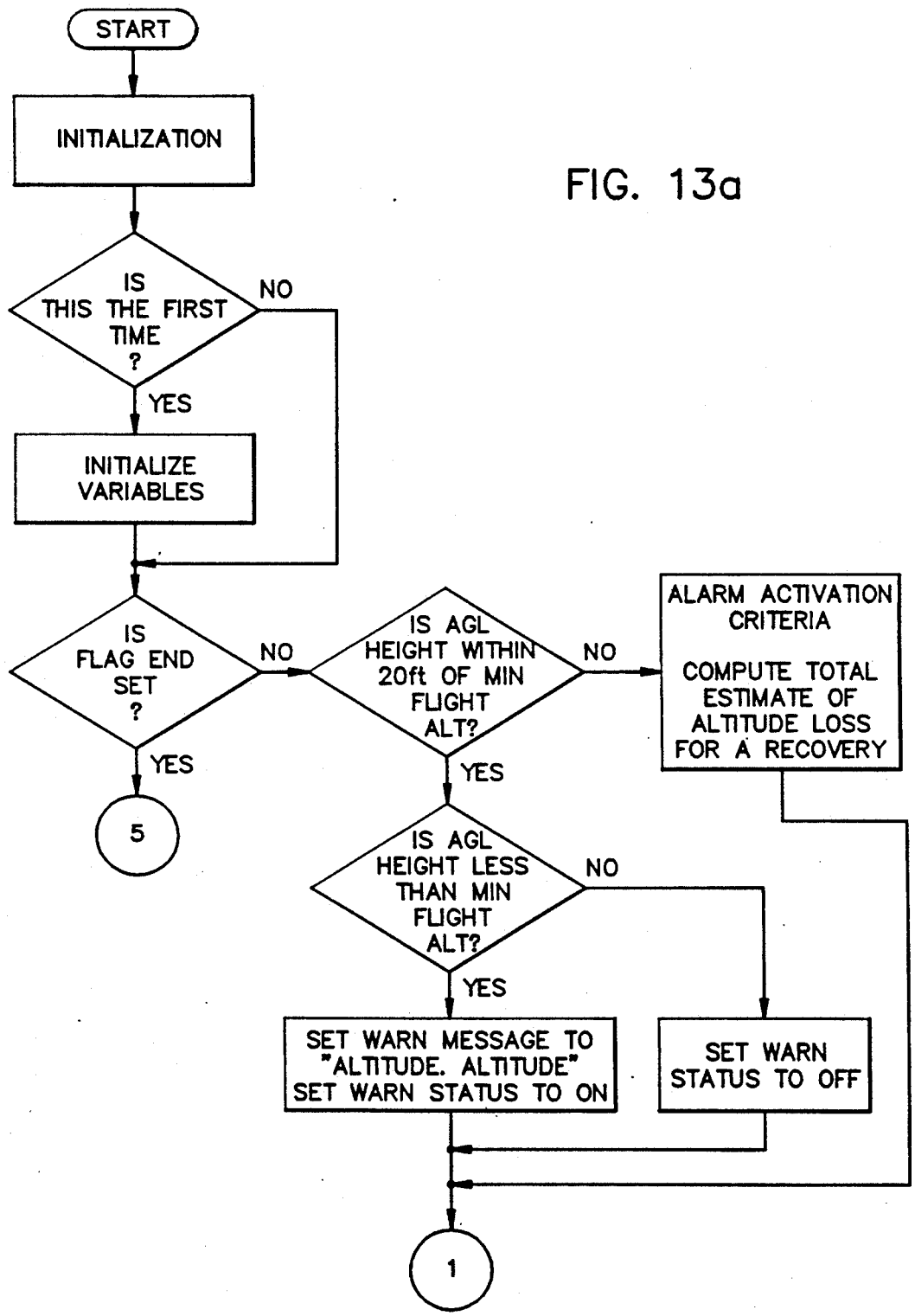
FIG. 13a illustrates a flow chart of a first portion of processing steps used in the method of FIG. 2 for warning status determination and output selection.

As shown in FIG. 13a, the first time the warning system or unit 28 is accessed it must be initialized. Data flags are set, required buffers or registers cleared, and variables used to determine if messages are suppressed or set and any output protocol adjusted. The warning unit 28 typically communicates messages to other apparatus such as a voice synthesizer or HUD for presentation to the pilot. Once the unit 28 is initialized the first processing step is to check for an end of processing marker or flag. Provided no such flag is detected processing proceeds as follows.

The warning processing unit 28 checks the HAGL data to see if the aircraft is within a predefined range about the minimum flight altitude. In the preferred embodiment, this range is set at 20 feet although other values can be used depending on the particular aircraft, flight usage, and margins of safety desired.

If the aircraft is out of the desired safety buffer range, the estimated altitude loss for a recovery is retrieved from the data processing unit 26 data, stored in memory 22. When the aircraft altitude is above the minimum set altitude, a warning status flag or indicator is set to an "Off" status. When the aircraft altitude is below the minimum level but within a 20 foot safety buffer range, the warning status flag is set to "On" and an "ALTITUDE, ALTITUDE" message is selected for transmission. A warn status counter is incremented and checked to see if it has reached a value of three at which point the warn status flag is returned to the "Off" state and the process returns to the next cycle.

Figure 13B:
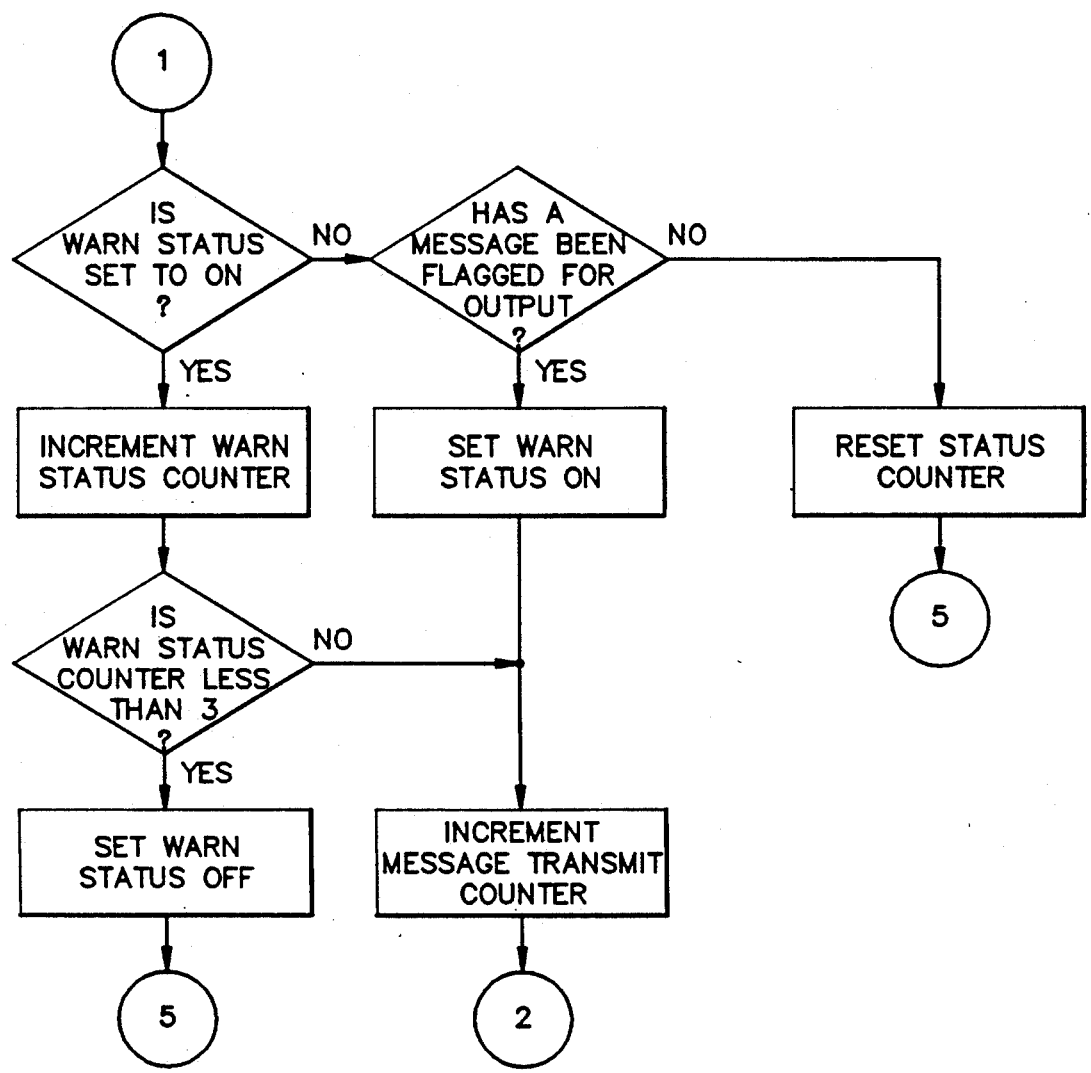
FIG. 13b illustrates a flow chart of a second portion of the processing steps used in the method of FIG. 2 for warning status determination and output selection.

As shown in FIG. 13b, when current measured altitudes are outside of the desired range or above minimum, the warn status flag is checked to verify that it is set to the Off state and a check is made for a message flagged for output. As long as no message is flagged, the status counter is reset and the process returns to the next cycle. Otherwise, the presence of flagged messages cause the warning unit 28 to set the warning status to the On state. When the warning status counter has a value less than three in the presence of a flagged altitude message or for a flagged message output, a message transmit counter is incremented.

Figure 13C:
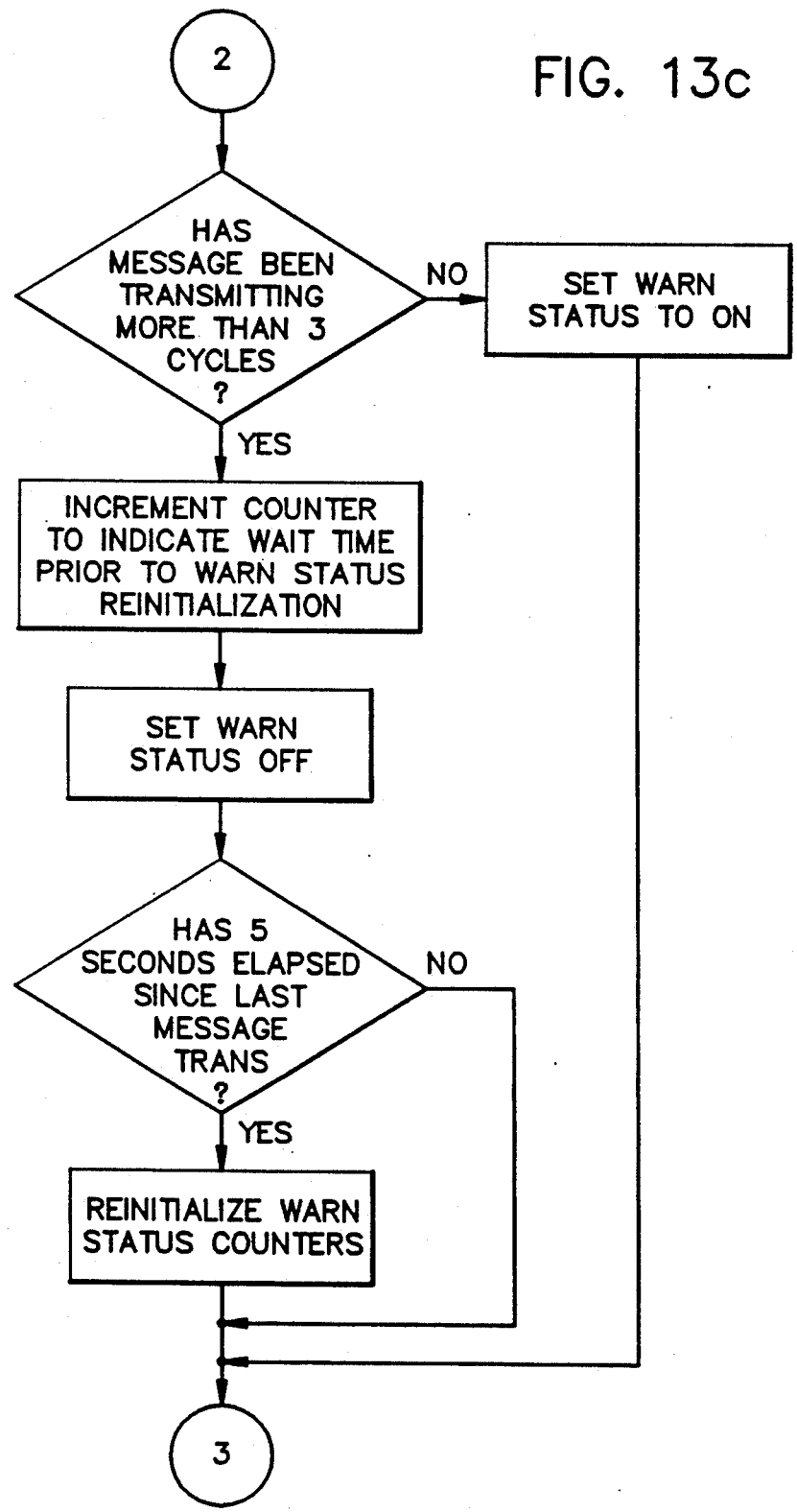
FIG. 13c illustrates a flow chart of a third portion of the processing steps used in the method of FIG. 2 for warning status determination and output selection.

As shown in FIG. 13c, the system 10 warning unit 28 checks to see if a flagged message has been transmitting for more than 3 cycles or collection periods, in which case the warning status is set to On. Otherwise, a wait time counter is incremented and the warning status is set to Off. If 5 seconds have passed since a previous message transmission, TM the warning status counters are reinitialized.

Figure 13D:
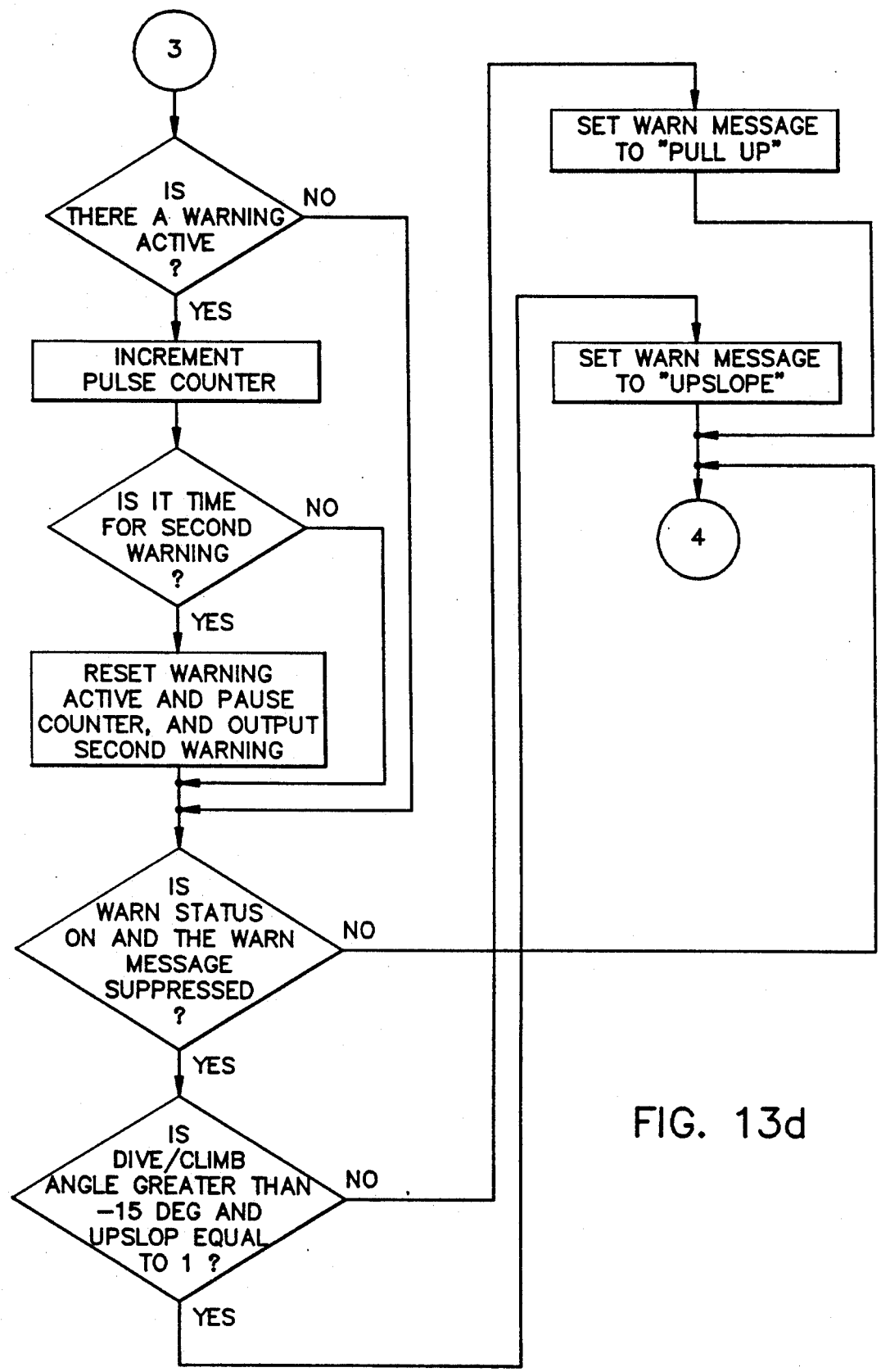
FIG. 13d illustrates a flow chart of a fourth portion of the processing steps used in the method of FIG. 2 for warning status determination and output selection.
Figure 13E:
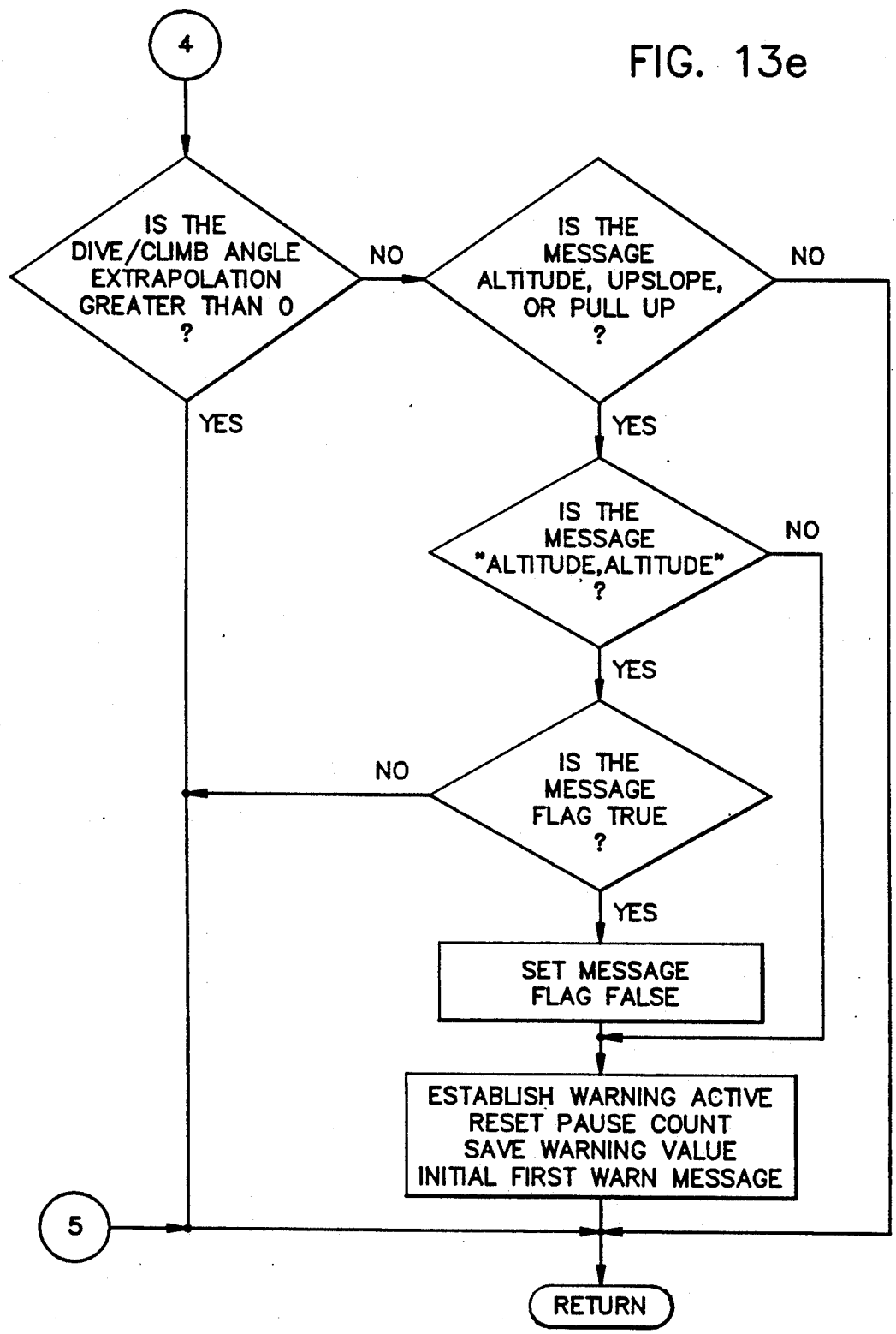
FIG. 13e illustrates a flow chart of a fifth portion of the processing steps used in the method of FIG. 2 for warning status determination and output selection.

As shown in FIG. 13d, the system 10 warning unit 28 checks for an active warning state. Active warnings cause the system to increment a pause counter and check to see if sufficient time has passed to issue a second warning. If no warning is active, the system proceeds. Otherwise, the warning active and pause counters are reset and the message transmitted. If there is no active message already, or it is not yet time for a second message, the system verifies that warning status is set in the On state and checks for is a suppression flag. When the suppression flag is set "On", the system 10 checks the dive/climb angle and the upslope measurements to see if they are within a desired range and then selects either an "UPSLOPE" or "PULL UP" warning message accordingly.

When current messages are not suppressed, warning unit 28 checks to the results of the dive/climb angle extrapolation to see if it is greater than zero. If it is, the GCAS 10 continues to processing. Otherwise, the system 10 checks for the activation of either an "ALTITUDE", "UPSLOPE", or "PULL UP" message. If none of these messages have been selected, then the the system 10 proceeds to the next processing cycle.

If, on the other hand, the "ALTITUDE, ALTITUDE" message has been selected the status of the message flag is verified. When, under these conditions, the flag is in the Off state the warning unit 28 proceeds to the next cycle. Otherwise, the warning unit 28 sets the message flag to the Off state. For this latter case, as well as for selection of the other messages available to the system 10, the system next sets warning status active, resets the pause counter, and saves the warning value as an initial first warning message.

Therefore, what has been described is a new method and apparatus for extrapolating aircraft flight path or altitude forward in time and automatically providing one or more audio warnings when a likelihood of ground collision is predicted.

The foregoing description of a preferred embodiment has been presented for purposes of illustration and description. It is not intended to be exhaustive nor to limit the invention to the precise form disclosed, and many modifications and variations are possible in light of the above teaching such as alternate cycle periods, roll or dive angle limits, or aircraft flight capabilities. The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. In an aircraft navigation system including a plurality of navigation sensors for producing navigation data and an aircraft data bus connected to said navigation sensors for conducting said navigation data, an apparatus for warning aircraft pilots of potential collisions with terrain comprising:
    process control means for controlling the transfer and storage of data in said warning apparatus and for initiating processing steps;
    digital interface means connected between said aircraft data bus and said process control means for interfacing said aircraft data bus for transferring data therebetween;
    shared storage means connected to said process control means for accumulating navigation data detected on said bus;
    data validation means connected to said process control means for detecting the validity of altitude data;
    data processing means connected to said process control means for extrapolating a terrain rate estimate in response to said altitude data, for extrapolating a dive/climb angle in response to said terrain rate estimate, for producing a dive recovery time in response to said extrapolated dive/climb angle, for producing a pilot response time, for producing a roll recovery time, and for producing altitude loss data in response to said pilot response time, said roll recovery time, and said dive recovery time; and
    warning means connected to said process control means for providing warnings based on an output of said data processing means.

2. The warning system of claim 1 wherein said digital interface means comprises:
    at least one remote terminal connected to said aircraft data bus; and
    interface process control means connected between said remote terminal and said process control means for polling said remote terminal for collected data, for formatting said data into a collected data message, and for transferring said collected data message to said process control means.

3. The warning system of claim 1 wherein said warning means comprises:
    a storage means for storing a series of preconfigured messages corresponding to predetermined altitude and flight path criteria; and
    selection means connected to said storage means and to said data processing means for retrieving a message; and output means for configuring said retrieved message as an aural message.

4. The warning system of claim 3 wherein said warning means comprises second output means for configuring said retrieved message as a visual display.

* * * * *

UNITED STATES PATENT AND TRADEMARK OFFICE
CERTIFICATE OF CORRECTION

PATENT NO. : 5,136,512
DATED :
INVENTOR(S) : August 4, 1992
　　　　　　　Richard C. Le Borne It is certified that error appears in the above-indentified patent and that said Letters Patent is hereby corrected as shown below:

In the Drawings, add Sheet 20 of 20, "APPENDIX I" as shown on the attached page.

Signed and Sealed this

Twelfth Day of July, 1994

Attest:

BRUCE LEHMAN

*Attesting Officer*　　　*Commissioner of Patents and Trademarks*

APPENDIX I $$f(V_{EAS}, \gamma) = B(V_{EAS}) \cdot [U(V_{EAS}) + ((|\gamma| - D_B(\gamma)) \cdot (L(V_{EAS}) - U(V_{EAS}))/B]/100$$

$$B(V_{EAS}) = V_S(K,I) \cdot V_{EAS} + V_Y(K,I)$$

$$U(V_{EAS}) = P_S(K,J,I) \cdot V_{EAS} + P_Y(K,L,I)$$

$$L(V_{EAS}) = P_S(K,J,I) \cdot V_{EAS} + P_Y(K,J,I)$$

$$D_B(\gamma) = \begin{cases} 1 & \text{FOR } |\gamma| < 5 \\ 5 & \text{FOR } 5 \leq |\gamma| < 10 \\ \text{INT}(|\gamma|) & \text{FOR } 10 \leq |\gamma| \end{cases}$$

$$B = \begin{cases} 4 & \text{FOR } |\gamma| < 5 \\ 5 & \text{FOR } 5 \leq |\gamma| < 10 \\ 10 & \text{FOR } 10 \leq |\gamma| \end{cases}$$

$\text{INT}(\gamma)$ = INTEGER VALUE OF THE DIVE/CLIMB ANGLE (ABSOLUTE VALUE)
$|\gamma|$ = ABSOLUTE VALUE OF THE DIVE/CLIMB ANGLE $V_{EAS}$ = EQUIVALENT AIRSPEED (KNOTS)
$V_S(K,I)$ = 2 DIMENSIONAL ARRAY REPRESENTING A SLOPE FUNCTION
$P_S(K,L,I)$ = 3 DIMENSIONAL ARRAY REPRESENTING A SLOPE FUNCTION
$V_Y(K,I)$ = 2 DIMENSIONAL ARRAY REPRESENTING AN ADDITIVE CONSTANT FUNCTION
$P_Y(K,L,I)$ = 3 DIMENSIONAL ARRAY REPRESENTING AN ADDITIVE CONSTANT FUNCTION

INDEXES:

$$K = \begin{cases} 1 & \text{FOR } V_{EAS} \leq 325 \\ 2 & \text{FOR } 325 < V_{EAS} \end{cases}$$

$$I = \begin{cases} 1 & \text{5g RECOVERY WITH g-ONSET AT 2g's/SECOND} \\ 2 & \text{5g RECOVERY WITH g-ONSET AT 2.5g's/SECOND} \\ 3 & \text{SAME AS 2 FOR } 0 \leq \gamma < -45, \text{ THEN INCREASE EXPECTED ONSET RATE LINEARLY TO 4g's/SECOND} \end{cases}$$

$$L = \begin{cases} 1 & \text{FOR } |\gamma| < 5 \\ 2 & \text{FOR } 5 \leq |\gamma| < 10 \\ \text{INT}(|\gamma|) + 2 & \text{FOR } 10 \leq |\gamma| \end{cases}$$

$J = L + I$